United States Patent [19]
Toyoda et al.

[11] Patent Number: 5,875,025
[45] Date of Patent: Feb. 23, 1999

[54] IMAGE INPUT APPARATUS

[75] Inventors: Haruyoshi Toyoda; Kazuhiro Nakamura, both of Hamamatsu, Japan

[73] Assignee: Hamamatsu Photonics K.K., Hamamatsu, Japan

[21] Appl. No.: 891,838

[22] Filed: Jul. 14, 1997

[30] Foreign Application Priority Data

Jul. 15, 1996 [JP] Japan .................................. 8-185149

[51] Int. Cl.⁶ ...................................................... G06K 9/74
[52] U.S. Cl. ............................................................ 356/71
[58] Field of Search ...................... 356/71; 382/124–127; 385/120

[56] References Cited

U.S. PATENT DOCUMENTS

| | | | |
|---|---|---|---|
| 3,906,520 | 9/1975 | Phillips | 356/71 |
| 4,785,171 | 11/1988 | Dowling, Jr. et al. | 250/227.28 |
| 4,932,776 | 6/1990 | Dowling, Jr. et al. | 356/71 |
| 5,426,296 | 6/1995 | Shikai et al. | |

FOREIGN PATENT DOCUMENTS

| | | |
|---|---|---|
| 348182 | 12/1989 | European Pat. Off. . |
| 372748 | 6/1990 | European Pat. Off. . |
| 6-300930 | 10/1994 | Japan . |
| 7-174947 | 7/1995 | Japan . |
| 7174947 | 7/1995 | Japan . |

*Primary Examiner*—Frank G. Font
*Assistant Examiner*—Amanda Merlino
*Attorney, Agent, or Firm*—Pillsbury Madison & Sutro LLP

[57] ABSTRACT

The present invention relates to an image input apparatus comprising a fiber optic plate and a light source for illuminating an entrance surface of the fiber optic plate. In order to obtain a vivid image, the image input apparatus according to the present invention comprises a specific structure for holding the light source at a predetermined position such that a luminous flux from the light source is made incident on the entrance surface of the fiber optic plate from a direction deviating from an angle region by which stray light can be incident on the entrance surface.

22 Claims, 18 Drawing Sheets

VERTICAL INCIDENT
ANGLE COMPONENT(°)

HORIZONTAL INCIDENT
ANGLE COMPONENT(°)

VERTICAL INCIDENT ANGLE COMPONENT
OF ILLUMINATION LIGHT (°)

IMAGE INPUT APPARATUS

BACKGROUND OF THE INVENTION

1. Field of the Invention

The present invention relates to an image input apparatus for obtaining an object image of a fingerprint, rubber stamp, or the like having irregularities (pits and projections).

2. Related Background Art

Known as this kind of image input apparatus, for example, are apparatus (first conventional example) disclosed in U.S. Pat. No. 4,932,776 and Japanese Patent Application Laid-Open No. 6-300930. As shown in FIG. 1, such an image input apparatus comprises a fiber optic plate (FOP) B in which a number of optical fibers A are bundled together and a light source (illuminating means) D for irradiating an entrance surface C of the fiber optic plate B, thereby outputting an image of a fingerprint or the like having irregularities. In this image input apparatus, when a finger C1 or the like comes into contact with the entrance surface C of the fiber optic plate B, light from the light source D is made incident on the fiber optic plate B only from protruded portions of the finger C1 which are directly in contact with the entrance surface C. Then, the incident light propagates through the fiber optic plate B so as to be outputted from an exit surface E, thereby yielding an image E1 (fingerprint image or the like) corresponding to the irregularity pattern of the fingerprint or the like.

In this image input apparatus, however, if light is incident from a part where the finger C1 or the like is not in contact with the entrance surface C, the image E1 to be outputted will have a lower contrast and become unclear. Accordingly, in general, the entrance surface C of the fiber optic plate B is inclined with respect to the optical axis (coinciding with the optical axis direction of each optical fiber therein) by a predetermined angle. In particular, such a fiber optic plate (first conventional example) having the entrance surface C inclined with respect to the optical axis has been known as slant FOP, and its angle of inclination $\theta_0$ has been referred to as slant angle. In the fiber optic plate B of the first conventional example, the slant angle $\theta_0$ and the numerical aperture NA of the optical fibers A are matched with each other in order to prevent the unnecessary light (stray light) incident thereon from the part not in contact with the entrance surface C (depressed portion of the finger or the like not in contact with the entrance surface C) from propagating through the optical fibers A (from satisfying a total reflection condition). As a result, the above-mentioned unnecessary light is not theoretically outputted from the exit surface E.

Also, for example, Japanese Patent Application Laid-Open No. 7-174947 discloses, as a fiber optic plate of a second conventional example, a structure in which an optical absorber is disposed between optical fibers constituting the fiber optic plate. As this optical absorber is disposed, light is prevented from traveling across the neighboring optical fibers, thereby the unnecessary light incident on the fiber optic plate from the part where the object C1 and the entrance surface C are not in contact with each other is efficiently attenuated in the fiber optic plate. Accordingly, in the fiber optic plate having such a structure, the contrast of the image outputted therefrom can be improved.

SUMMARY OF THE INVENTION

Having studied the prior art mentioned above, the inventors have found the following problems. Namely, when light travels across the neighboring optical fibers in the fiber optic plate, the output image (image of the object having irregularities on its surface) may lower its contrast and become unclear. For example, even when the optical absorber is disposed between the neighboring optical fibers as in the case of the fiber optic plate disclosed in the above-mentioned Japanese Patent Application Laid-Open No. 7-174947, it is difficult for the optical absorber to completely absorb the light, and the light incident on one optical fiber from the part where the object is not in contact with the entrance surface may propagate to its neighboring optical fiber. Then, as shown in FIG. 2, when such light is reflected by one or both of a side face F of the fiber optic plate B and the entrance surface C, thus reflected light may be guided to a direction in which the light is totally reflected within the optical fiber so as to propagate through the optical fiber and be outputted from the exit surface E. In such a case, as mentioned above, the image to be outputted may become unclear under the influence of the output of unnecessary light (stray light).

In order to overcome the foregoing problems, an object of the present invention is to provide an image input apparatus for obtaining a vivid image of an object having irregularities (pits and projections) on its surface.

In order to obtain a vivid image, the image input apparatus according to the present invention comprises a specific structure for holding a light source at a predetermined position such that a luminous flux from the light source is made incident on the entrance surface of a fiber optic plate (hereinafter referred to as FOP) from a direction deviating from an angle region by which stray light can be incident on the entrance surface. Specifically, the image input apparatus according to the present invention comprises a first FOP in which a plurality of optical fibers are bundled together; a housing for accommodating the first FOP; a plurality of light sources for illuminating the entrance surface of the first FOP; and a holding member having holding sections for holding the plurality of light sources such that the plurality of light sources surround at least a part of an opening of the housing. Here, the first FOP has the entrance surface, which is inclined with respect to the optical axis of each optical fiber by a predetermined slant angle $\theta_0$ ($0° < \theta_0 < 90°$), and an exit surface opposing the entrance surface. Also, the housing has an upper face bored with the opening for exposing the entrance surface. Further, the holding sections of the holding member are disposed on the upper face of the housing and positioned so as to face each other across the opening of the housing.

In particular, in the image input apparatus according to the present invention, the holding member holds each light source in a state where, of incident angle components formed between the luminous flux emitted from the light source and the entrance surface, a vertical incident angle component $\theta_V$ on a plane orthogonal to a reference end on the entrance surface defining the slant angle $\theta_0$ is set to a range deviating from an angle region by which stray light can be incident on the entrance surface.

Here, an angle X by which the stray light can be incident on the entrance surface (hereinafter referred to as stray light admissible angle) is within the range given by the following expression:

$$(X_C - \Theta) \leq X \leq (X_C + \Theta)$$

In other words, the holding member holds each light source in a state where the vertical incident angle component $\theta_V$ of the luminous flux from the light source is within the range of 0° to $(X_C - \Theta)$ or within the range of $(X_C + \Theta)$ to 180°.

Here, $X_C$ is a stray light admissible center angle given by an expression $(90-\sin^{-1}(n_{core}\cdot\sin(90°-3\theta_0)))$; $n_{core}$ is a refractive index of a core in the optical fiber; $\theta_0$ is the slant angle; $\Theta$ is a total reflection critical angle in the air given by an expression $(\sin^{-1}(n_{core}\cdot\sin(90°-S_C-\phi)))$; $S_C$ is a stray light admissible center angle in the optical fiber given by an expression $(\sin^{-1}((1/n_{core})\cdot\sin X_C))$; $\phi$ is a total reflection critical angle in the optical fiber given by an expression $(\sin^{-1}(n_{clad}/n_{core}))$; and $n_{clad}$ is a refractive index of a cladding in the optical fiber.

Further, in the image input apparatus according to the present invention, the holding member holds each light source in a state where, of the incident angle components formed between the luminous flux emitted from the light source and the entrance surface, a horizontal incident angle component $\theta_H$ on a plane orthogonal to the entrance surface and in parallel to the reference end on the entrance surface defining the slant angle $\theta_0$ is set within the range of at least 0° but not greater than 20°. More preferably, the holding member holds each light source such that, of the luminous flux emitted from the light source, the center pencil becomes in parallel to the entrance surface ($\theta_H=0°$). In this case, it is preferred that the holding member hold the light source such that, of directional vector components of the center pencil, a component on the entrance surface advances from an auxiliary end on the entrance surface opposing the reference end toward the reference end.

The holding member may further comprise a structure for adjusting the divergent angle of the luminous flux emitted from the light source. Also, the holding member may comprise a light-shielding member for covering, by way of an air gap, the entrance surface of the first FOP. Preferably, the slant angle of the first FOP is within the range of 25° to 40°.

The image input apparatus according to the present invention further comprises an image sensor having a light receiving surface positioned so as to face the exit surface of the first FOP, and can realize various kinds of structures.

Specifically, a second FOP may be disposed between the first FOP and the image sensor. The second FOP may be a taper FOP which tapers down in its cross-sectional area from the first FOP toward the image sensor. Also, the exit surface and entrance surface of the first FOP may be in parallel to each other. In addition, an optical system may be disposed between the first FOP and the image sensor or between the second FOP and the image sensor.

According to the above-mentioned holding structure, it becomes easier to control the irradiating direction of the light source, while the luminous flux is restrained from being irradiated within the above-mentioned region of stray light admissible angle X. As a result, a desired light component can securely be outputted alone from the exit surface, thereby yielding a more vivid image (whose contrast is not lowered by stray light).

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, the image input apparatus according to the present invention will be explained with reference to FIGS. 3 to 35. Among the drawings, elements identical to each other will be referred to with marks identical to each other, without their overlapping explanations repeated.

Figure 1:
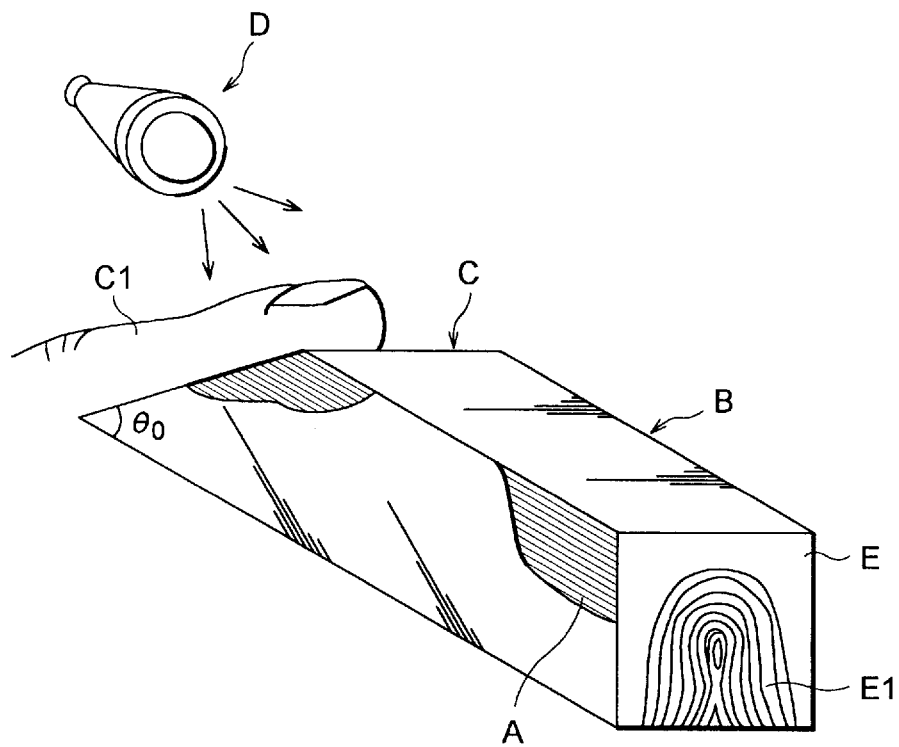
FIG. 1 is a view in an assembling process showing a configuration of a conventional image input apparatus.
Figure 2:
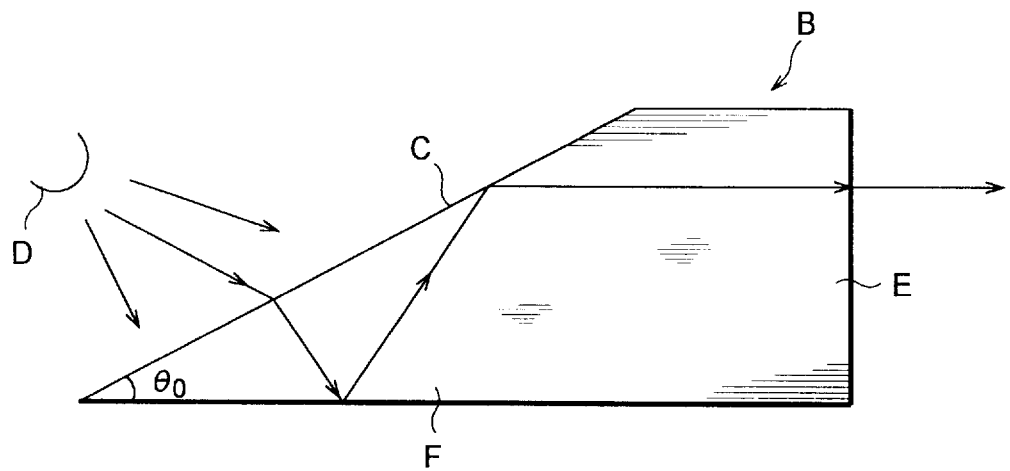
FIG. 2 is a view for explaining problems of the conventional image input apparatus.
Figure 3:
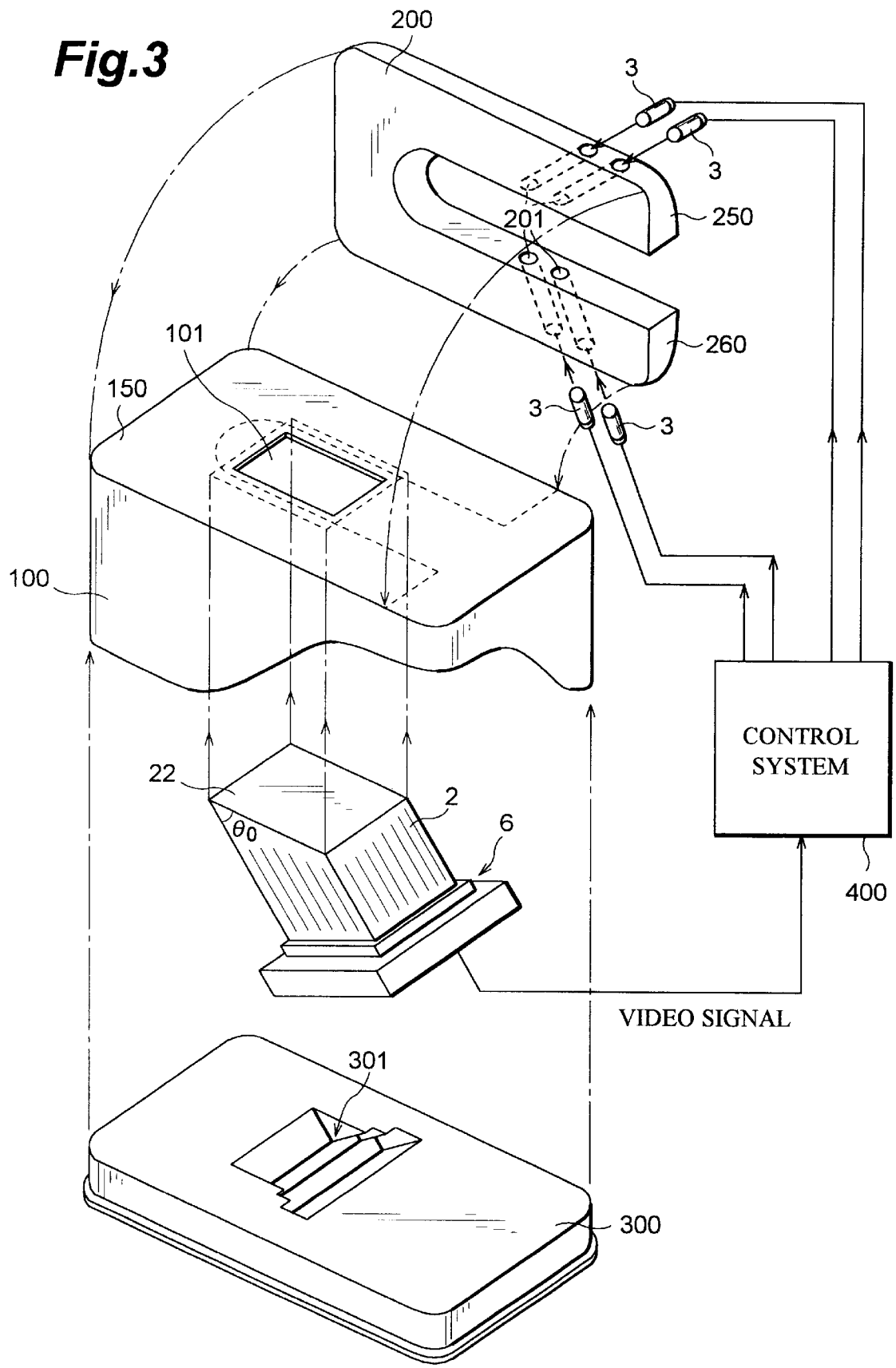
FIG. 3 is an assembling process diagram for explaining an image input apparatus according to the present invention.

FIG. 3 is a view in an assembling process for explaining a configuration of the image input apparatus according to the present invention. This image input apparatus according to the present invention comprises an FOP 2 (first FOP) in which a plurality of optical fibers are bundled together. This FOP 2, which has an entrance surface 22 inclined with respect to the optical axis of each optical fiber by a predetermined slant angle $\theta_0$ (0°<$\theta_0$<90°) and an exit surface 23 opposing the entrance surface 22, is accommodated in a housing 100. An image sensor (CCD) 6 is disposed on the exit surface 23 side of the FOP 2 and is supported by a pedestal 300 having an engagement depression 301 formed on a main surface thereof. The pedestal 300 engages with the housing 100, thereby constituting a dark room for accommodating the FOP 2. Further, the housing 100 has an upper face 150 bored with an opening 101 for exposing the entrance surface 22 of the FOP 2. Light sources (illuminating means) 3 for illuminating the entrance surface 22 of the FOP 2 are held at predetermined positions by a holding member 200. This holding member 200 comprises holding sections 250 and 260 disposed so as to face each other across the opening 101 of the housing 100. Each light source 3 is accommodated in a hole 201 formed in any of the holding sections 250 and 260.

The image input apparatus according to the present invention further comprises a control system 400. The control system 400 receives an electric signal (video signal) from the image sensor 6, subjects thus received signal to a predetermined image processing, and controls driving of the light sources 3.

Figure 4:
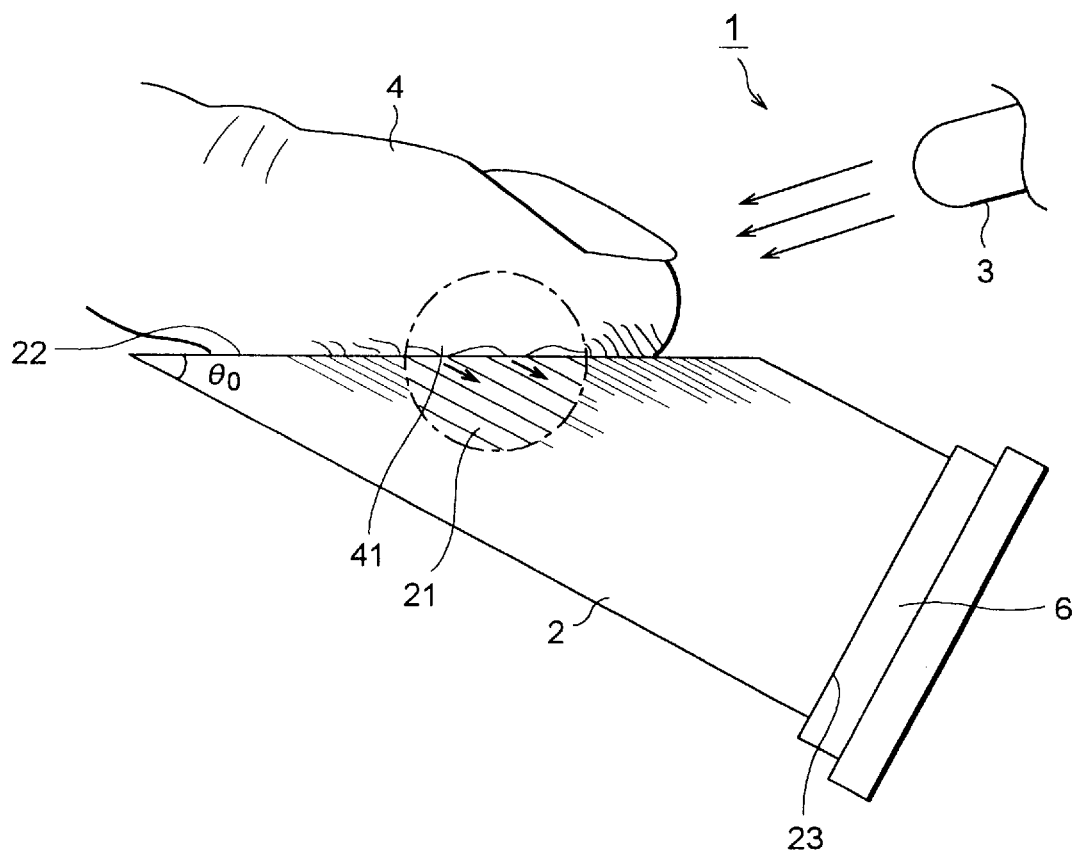
FIG. 4 is a view showing a schematic configuration of the image input apparatus according to the present invention.
Figure 5:
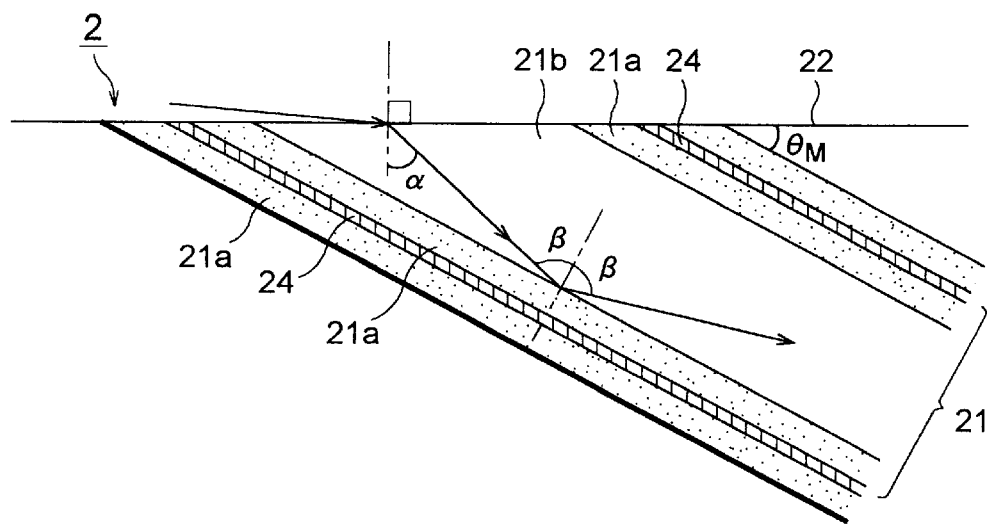
FIG. 5 is a view for explaining how light propagates in a fiber optic plate.
Figure 6:
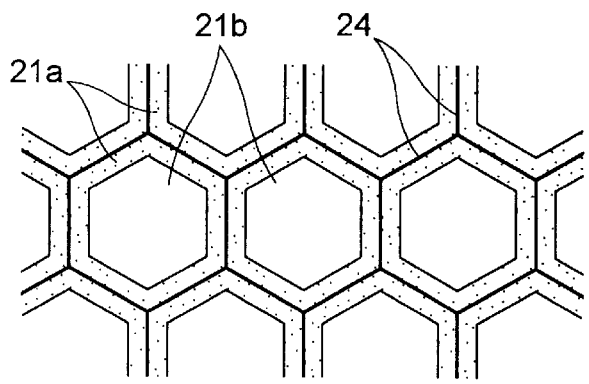
FIG. 6 is a view showing a cross-sectional configuration of the fiber optic plate in the image input apparatus according to the present invention.

FIG. 4 is a view showing a configuration of a main part of the image input apparatus according to the present invention. As shown in FIG. 4, this image input apparatus 1 comprises, at least, the FOP 2 and, as a light source, an LED 3. The FOP 2 comprises a number of optical fibers 21 which are substantially oriented to the same direction and bundled together. Both end portions of the optical fibers 21 are respectively provided with the entrance surface 22 and the exit surface 23, thereby the light incident on the entrance surface 22 can be outputted from the exit surface 23. As shown in FIGS. 5 and 6, it is preferred that an optical absorber 24 be disposed between neighboring optical fibers 21 within the FOP 2. The optical absorber 24, used for establishing optical insulation between the neighboring optical fibers 21, functions to absorb the light leaking out of the optical fibers 21, thereby preventing the light from traveling across the neighboring optical fibers 21. Here, each optical fiber 21 is constituted by a core 21b having a predetermined refractive index $n_{core}$ and a cladding 21a, disposed around an outer periphery of the core 21b, having a refractive index $n_{clad}$ lower than $n_{core}$.

The entrance surface 22, used for making light incident on the optical fiber 21 by way of protruded portions of an object 4 in contact therewith, is inclined with respect to the optical axis direction of the optical fiber 21 by a predetermined angle (neither in parallel nor perpendicular thereto). It is preferred that the angle of inclination $\theta_0$ (slant angle) of the entrance surface 22 be set such that the unnecessary light incident thereon from depressed portions (noncontact portions) of the object 4 which are not in contact with the entrance surface 22 (reflected light from the depressed portions) does not propagate through the optical fiber 21. Such a slant angle of the entrance surface 22 is determined according to the refractive indices of the cladding 21a and core 21b of the optical fiber 21 as shown in FIG. 5. Namely, assuming that the refractive index of the cladding 21a is $n_{clad}$, the refractive index of the core 21b is $n_{core}$, and the refractive index of the air is 1, it becomes an angle of inclination $\theta_0$ smaller than an angle $\theta_M$ which satisfies the following expressions (1) to (3):

$n_{core}\cdot\sin\beta=n_{clad}\cdot\sin 90°$ (condition for total reflection propagation) (1)

$n_{core}\cdot\sin\alpha=\sin 90°$ (condition for an incident angle of 0°) (2)

$\theta_M+(90°+\alpha)+(90°-\beta)=180°$ (3)

Namely, the slant angle $\theta_0$ is an angle at which the light incident on the entrance surface 22 substantially in parallel thereto propagates through the optical fiber 21 while being totally reflected by an angle close to its critical angle. When this slant angle $\theta_0$ is made smaller than $\theta_M$, no matter by which angle light is incident from the air, it is theoretically prevented from being reflected by an interface between the cladding 21a and core 21b and thereby propagating through the optical fiber 21. Specifically, for example, assuming that the refractive indices of the cladding 21a and core 21b in the optical fiber 21 are respectively $n_{clad}$=1.45 and $n_{core}$=1.50, the theoretical angle of inclination $\theta_M$=about 36°, thereby the slant angle $\theta_0$ can be set to an angle smaller than 36°, e.g., about 30°. Though the slant angle $\theta_0$ cannot be set independently of the material of the optical fiber 21 used since it depends on the refractive indices $n_{clad}$ and $n_{core}$ of the core 21b and cladding 21a of the optical fiber 21, it is typically set within the range of about 20° to 40°.

On the other hand, the exit surface 23, which is an output surface for emitting the light propagating through the optical fiber 21 after being made incident on the entrance surface 22, is substantially orthogonal to the optical axis direction of the optical fiber 21 so that the light can easily be outputted from the optical fiber 21.

In thus configured FOP 2, when a predetermined optical path length is set between the entrance surface 22 and the exit surface 23, the light incident thereon from portions (e.g., in the air) where the object 4 and the entrance surface 22 are not in contact with each other is attenuated while propagating through the optical fiber, so as to be theoretically prevented from being outputted from the exit surface 23.

Figure 7:
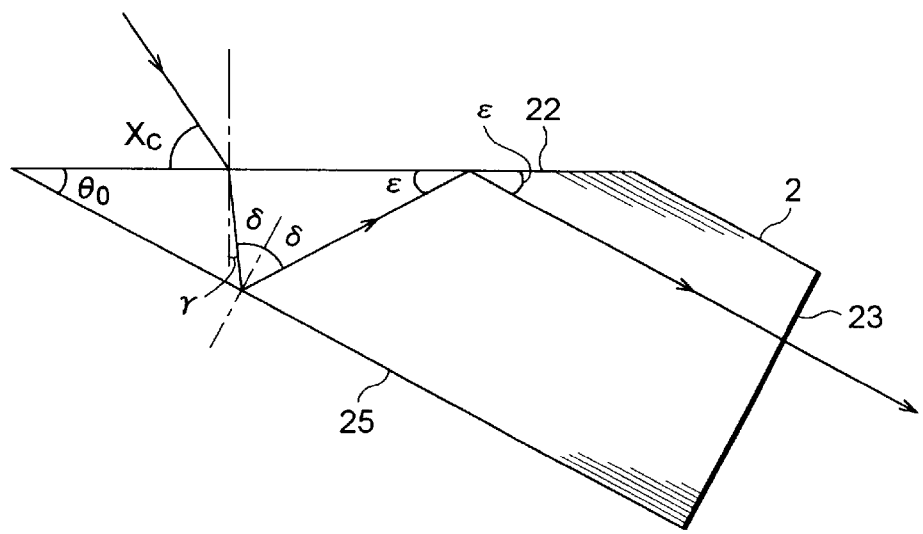
FIG. 7 is a view for explaining a mechanism by which stray light is generated in the fiber optic plate.

It is, however, difficult for the optical absorber 24 disposed between the optical fibers 21 in the FOP 2 to completely prevent the light from traveling across the optical fibers 21. Hence, in the case where strong light is incident thereon, for example, the incident light may be transmitted through the optical absorber 24 and guided to the neighboring optical fiber 21. As shown in FIG. 7, if such light is reflected by the cladding 21a or core 21b of the FOP 2, the optical absorber 24, or a side face 25 of the FOP 2 (light being reflected by the side face 25 in FIG. 7) and further reflected by the entrance surface 22 toward the inside of the FOP 2, the light will propagate through the optical fiber 21 (will advance along the optical axis direction of the optical fiber 21) while being totally reflected, so as to be outputted from the exit surface 23.

Therefore, the LED 3, which is a light source, is held by the holding member 200 such that the light from the light source is incident on the entrance surface 22 of the FOP 2 within a range which deviates from a stray light admissible angle range (incident angle of stray light reachable to the exit surface 23). As shown in FIG. 4, the LED 3 is means for irradiating the object 4 in contact with the entrance surface, e.g., a finger, with light having a predetermined wavelength, thereby effectively increasing the light quantity incident on the entrance surface 22 from the object 4 in contact therewith. As the LED 3, preferably used is one which can emit light with a high directivity. Namely, when such an LED 3 is used, it becomes easier to control the light irradiating direction (advancing direction of the luminous flux emitted from the light source), thereby preventing the light from being irradiated at a stray light admissible angle. Here, without being restricted to the LED 3, other light emitters such as lasers and lamps may be used as the light source as long as they can irradiate light at an angle different from the stray light admissible angle. Also, an optical system such as lens may be disposed between the light source and the entrance surface 22 so as to irradiate the entrance surface 22 with the collimated light.

Figure 8:
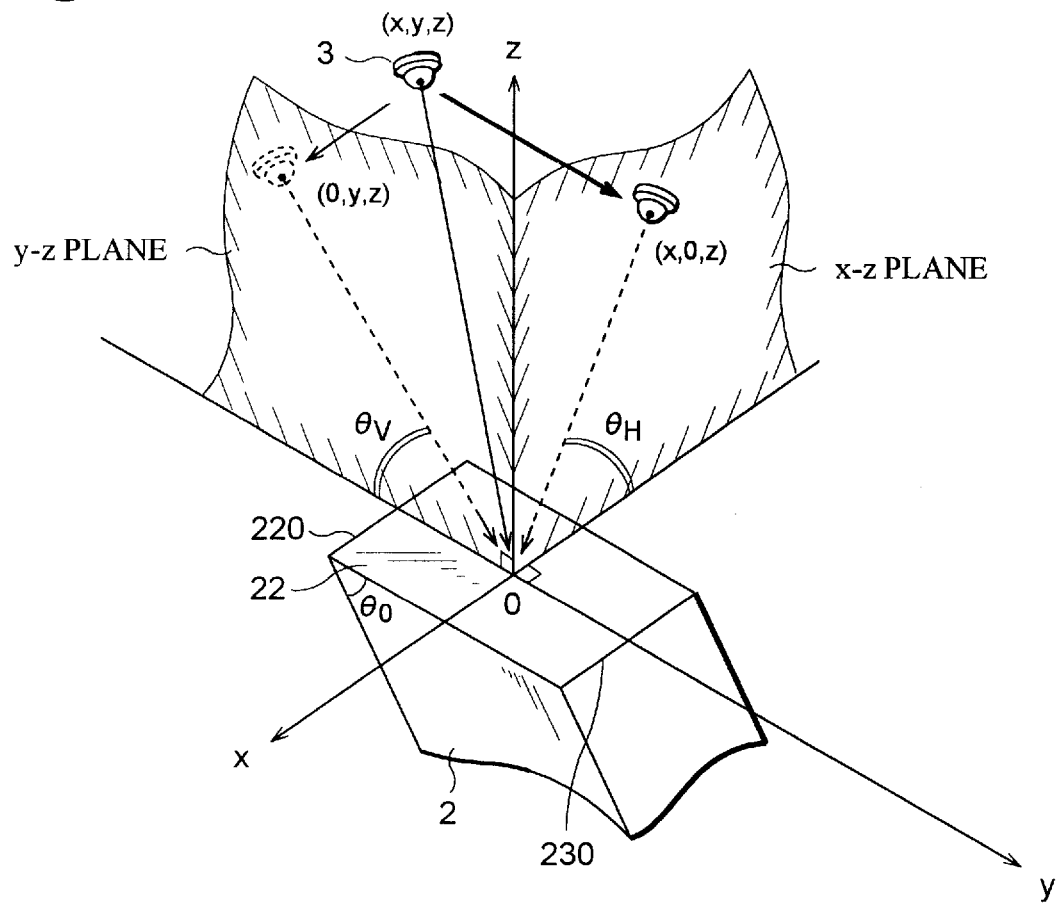
FIG. 8 is a view for explaining the incident angle of a luminous flux incident on the fiber optic plate.

In this specification, as shown in FIG. 8, incident angle components of a luminous flux illuminating the entrance surface 22 of the FOP 2 are expressed as being divided into a vertical incident angle component $\theta_V$ and a horizontal incident angle component $\theta_H$.

In FIG. 8, it is defined that the entrance surface 22 of the FOP 2 is a surface on an x-y plane, and a normal on the x-y plane is the z axis. Accordingly, the x axis is an axis on the x-y plane which is in parallel to each of a reference end 220 for defining the slant angle $\theta_0$ (acute angle) and an auxiliary end 230 opposing the reference end 220 across the entrance surface 22. Also, the y axis is an axis on the x-y plane which is at least orthogonal to the reference end 220. Here, the reference end 220 is a border line between the side face 25 and the entrance surface 22 which is a segment containing the slant angle $\theta_0$ (acute angle). Also, the auxiliary end 230 is a border line between the side face 25 and the entrance surface 22 which is a segment opposing the reference end 220.

Accordingly, the vertical incident angle component $\theta_V$ refers to, when an incident luminous flux directed toward the entrance surface 22 is projected onto the depicted y-z plane, an angle component (0° to 180°) formed between the incident luminous flux component on the y-z plane and the y axis. On the other hand, the horizontal incident angle component $\theta_H$ refers to, when the incident luminous flux directed toward the entrance surface 22 is projected onto the depicted x-z plane, an angle component (0° to 90°) formed between the incident luminous flux component on the x-z plane and the x axis. Here, concerning the vertical incident angle component $\theta_V$, 0° refers to the reference end 220 side as viewed from the origin O on the entrance surface 22, whereas 180° refers to the reference end 230 side as viewed from the origin O. On the other hand, concerning the horizontal incident angle component $\theta_H$, 0° indicates that it coincides with the x axis in FIG. 8, whereas 90° indicates that it coincides with the z axis.

Further, the stray light refers to unnecessary light which enters the FOP 2 from the entrance surface 22 and then is transmitted through the optical absorber 24 so as to propagate through the optical fiber 21 independently of its optical axis. Also, the stray light admissible angle X is the incident angle of the unnecessary luminous flux incident on the entrance surface 22 (defined by an angle component on the y-z plane similar to the above-mentioned vertical incident angle component in which the slang angle side of the FOP 2 is set to 0°). As shown in FIG. 7, when light enters the FOP 2 from the entrance surface 22 at this angle, as the result of reflection by boundary surfaces such as the side face 25 and the entrance surface 22, it is outputted from the exit surface 23 after propagating through the optical fiber 21 while being totally reflected thereby. The stray light admissible angle X is within the range given by the following expression (4):

$$(X_C-\Theta) \leq X \leq (X_C+\Theta) \tag{4}$$

wherein $X_C$ is a stray light admissible center angle given by an expression $(90°-\sin^{-1}(n_{core} \cdot \sin(90°-3\theta_0)))$; $n_{core}$ is the refractive index of the core in the optical fiber; $\theta_0$ is the slant angle; $\Theta$ is a total reflection critical angle in the air given by an expression $(\sin^{-1}(n_{core} \cdot \sin(90°-S_C-\phi)))$; $S_C$ is a stray light admissible center angle in the optical fiber given by an expression $(\sin^{-1}(1/n_{core}) \cdot \sin X_C)$; $\phi$ is a total reflection critical angle in the optical fiber given by an expression $(\sin^{-1}(n_{clad}/n_{core}))$; and $n_{clad}$ is the refractive index of the cladding in the optical fiber (see FIG. 9).

Namely, in FIG. 7, assuming that the angle of refraction of the light incident on the FOP 2 having the refractive index $n_{core}$ at the angle of $X_C$ (vertical incident angle component) with respect to the entrance surface 22 is γ, according to laws of refraction, the following expression (5):

$$\sin(90°-X_C) = n_{core} \cdot \sin \gamma \tag{5}$$

is established.

On the other hand, as shown in FIG. 7, assuming that the angle of refraction when the light propagating through the optical fiber 21 with the angle γ from the entrance surface 22 is totally reflected by the side face 25 is δ, and the angle of refraction when this light is further totally reflected by the entrance surface 22 is ε, from the sum of interior angles of a triangle connecting the incident point of the entrance surface 22, the reflecting point of the side face 25, and the reflecting point of the entrance surface 22, the following expression (6):

$$(90°-\gamma)+2\delta+\epsilon=180° \tag{6}$$

is established.

Also, in FIG. 7, from the sum of interior angles of a triangle connecting the slant angle $\theta_0$ of the FOP 2, the reflecting point of the side face 25, and the reflecting point of the entrance surface 22, the following expression (7):

$$\theta_0+(90°+\delta)+\epsilon=180° \tag{7}$$

is established.

Here, the light reflected into the FOP 2 by the entrance surface 22 propagates therethrough with the angle ε with respect to the entrance surface 22. Then, when the angle ε of the light coincides with $\theta_0$, which is the optical axis direction of the FOP 2, the light reaches the exit surface 23. Namely, when the following expression (8) is established, the incident stray light with the incident angle $X_C$ (angle component corresponding to the vertical incident angle component) propagates through the FOP 2 in parallel to the optical axis thereof.

$$\epsilon = \theta_0 \qquad (8)$$

Accordingly, when δ is eliminated by expressions (6) to (8) so that γ is expressed as a function of $\theta_0$, and the resulting function is used to substitute for γ in expression (5), the stray light admissible center angle $X_C$ is given as represented by the following expression (9):

$$X_C = 90° - \sin^{-1}(n_{core} \cdot \sin(90° - 3\theta_0)) \qquad (9)$$

Figure 9:
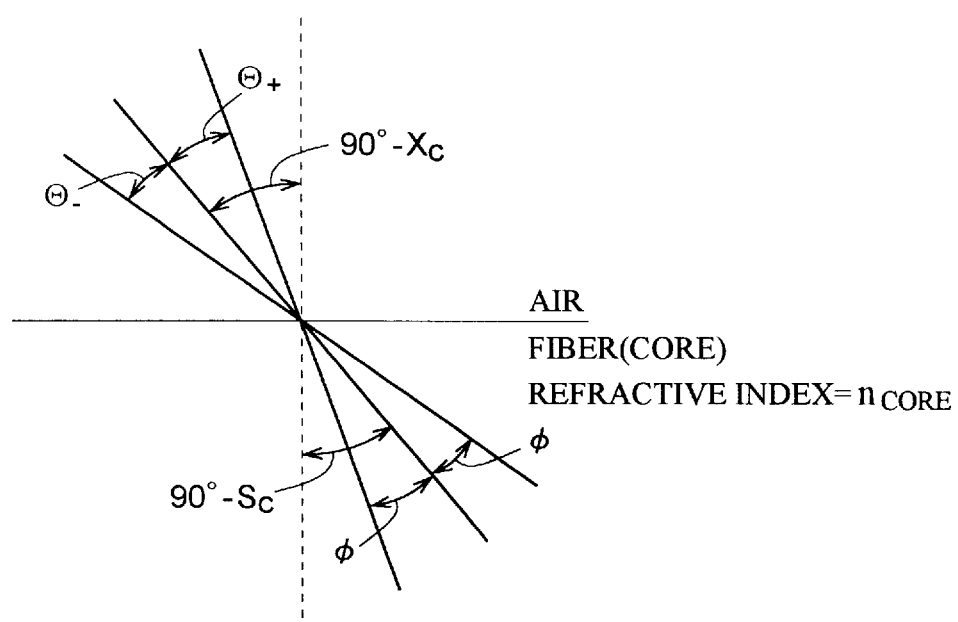
FIG. 9 is a view for explaining a stray light admissible range.

The stray light admissible center angle $X_C$ is an angle component on the y-z plane corresponding to the vertical incident angle component of the luminous flux when the stray light finally becomes in parallel to the optical axis direction of the optical fiber 21. Here, the possible range of the stray light admissible angle X by which the stray light is outputted from the exit surface 23 after propagating through the optical fiber 21 while being totally reflected thereby is an angle range obtained when the total reflection critical angle Θ is added to and subtracted from the stray light admissible center angle $X_C$ as shown in FIG. 9. The total reflection critical angle refers to the minimal incident angle of the light from the core 21b to the cladding 21a when the light propagates through the optical fiber 21 while being totally reflected thereby. Accordingly, the stray light admissible angle is within the range from ($X_C$−Θ) to ($X_C$+Θ), which is represented by expression (4). In FIG. 9, Θ refers to the total reflection critical angle (Θ) on the reference end 220 side from the stray light admissible center angle $X_C$, whereas $Θ_+$ refers to the total reflection critical angle (Θ) on the auxiliary end 230 side from the stray light admissible center angle $X_C$.

In the following, experiments for measuring the output of the FOP 2 (output from the exit surface 23) concerning the vertical incident angle component $\theta_V$ and horizontal incident angle component $\theta_H$, which are incident angle components of the luminous flux emitted from the light source, will be explained.

Figure 10:
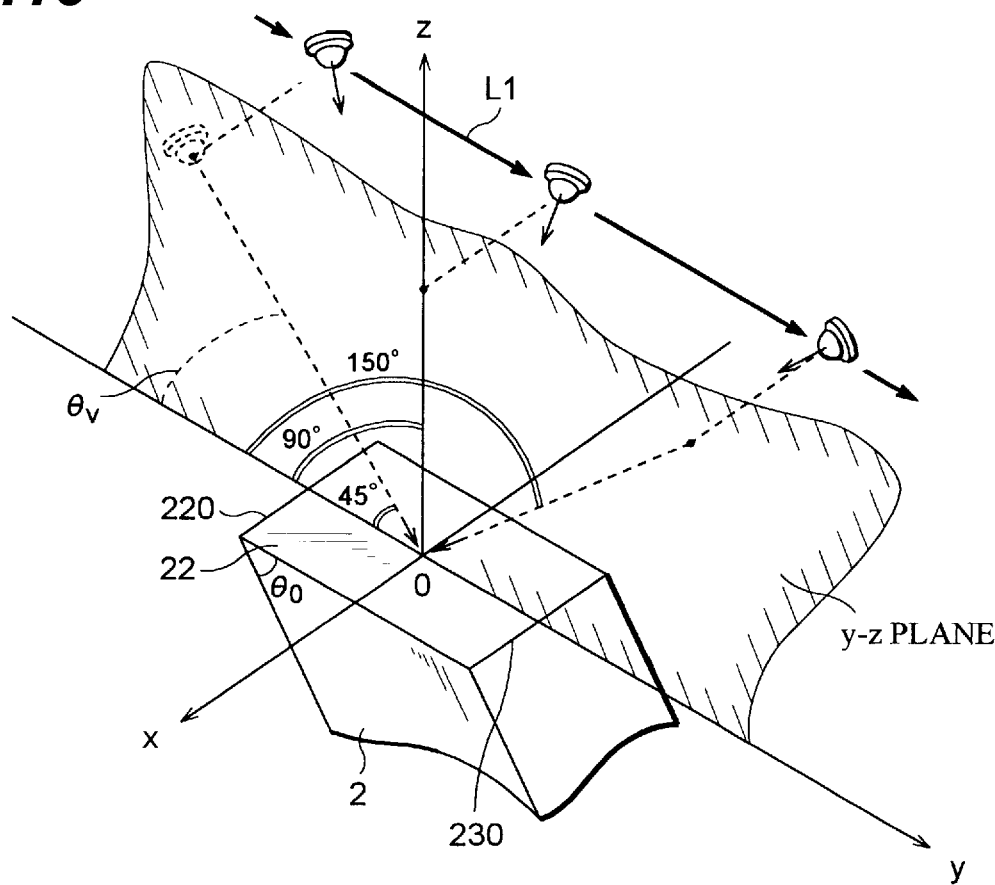
FIG. 10 is a view for explaining a method of measuring the stray light admissible range concerning a vertical incident angle component.

First, concerning the vertical incident angle component $\theta_V$, as shown in FIG. 10, in the respective states where the horizontal incident angle component $\theta_H$ was set to 15°, 30°, and 90° with respect to the FOP 2 having a slant angle of 30°, while the vertical incident angle component $\theta_V$ was changed from 0° to 180°, the output light quantity from the exit surface 23 was measured. More specifically, in the respective states where the horizontal incident angle component $\theta_H$ was set to the predetermined angles (15°, 30°, and 90°), measurement was effected while the LED 3 was moved in the direction indicated by arrow L1 in FIG. 10 together with an optical system (lens) for collimating the output light from the LED 3.

Figure 11:
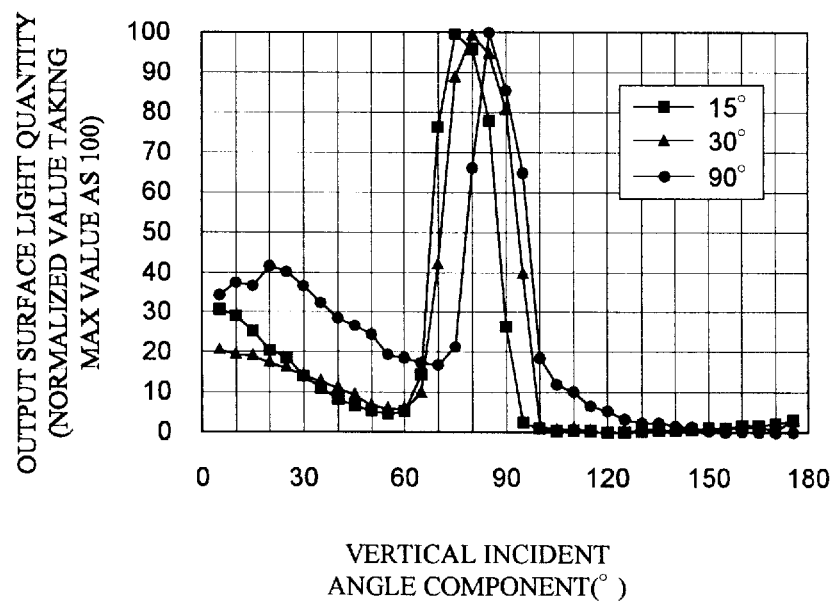
FIG. 11 is a graph showing a relationship between the vertical incident angle component and emitted light quantity determined by the method shown in FIG. 10.

FIG. 11 is a graph showing the relationship between the vertical incident angle component $\theta_V$ and quantity of light outputted from the exit surface 23 measured by the method shown in FIG. 10. In this graph, the ordinate indicates a normalized value in which the maximum output is taken as 100.

As can be seen from this graph, the stray light admissible angle X is within the range of about 70° to 110° without considerably depending on the horizontal incident angle component $\theta_H$. Namely, it can be seen that, when the light source 3 is disposed at a position where the luminous flux emitted from the light source 3 is incident on the entrance surface 22 such that its vertical incident angle component $\theta_V$ is on the outside of the above-mentioned range (70° to 110°), the stray light can be restrained from propagating through the FOP 2.

Figure 12:
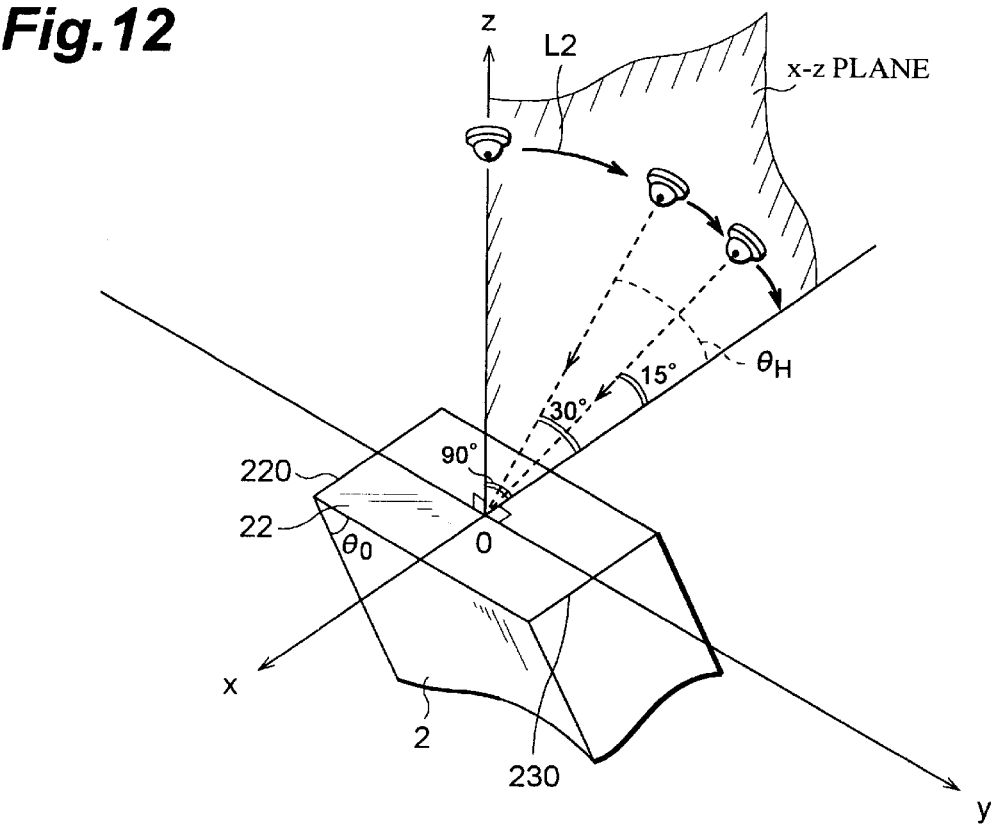
FIG. 12 is a view for explaining a method of measuring the stray light admissible range concerning a horizontal incident angle component.

On the other hand, concerning the horizontal incident angle component $\theta_H$, as shown in FIG. 12, in the state where the vertical incident angle component $\theta_V$ was set to 90° with respect to the FOP 2 having a slant angle of 30°, while the horizontal incident angle component $\theta_H$ was changed from 0° to 90°, the output light quantity from the exit surface 23 was measured. More specifically, in the state where the vertical incident angle component $\theta_V$ was set to a predetermined angle (90°), measurement was effected while the LED 3 was moved in the direction indicated by arrow L2 in FIG. 12 together with an optical system (lens) for collimating the output light from the LED 3.

Figure 13:
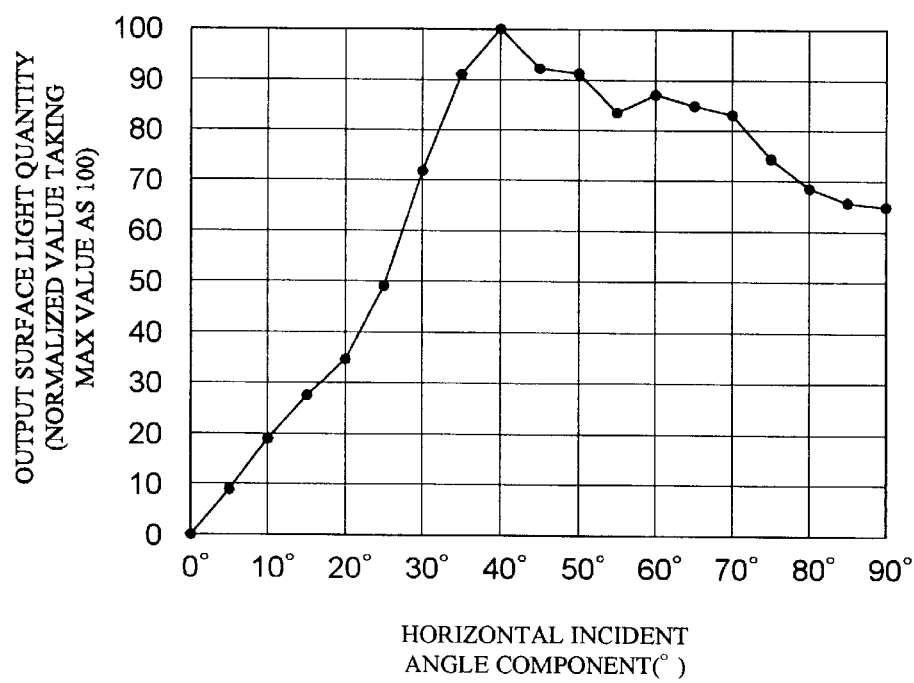
FIG. 13 is a graph showing a relationship between the horizontal incident angle component and emitted light quantity determined by the method shown in FIG. 12.

FIG. 13 is a graph showing the relationship between the horizontal incident angle component $\theta_H$ and quantity of light outputted from the exit surface 23 measured by the method shown in FIG. 12. In this graph, the ordinate indicates a normalized value in which the maximum output is taken as 100.

As can be seen from this graph, the horizontal incident angle component $\theta_H$ closer to 0° is more preferable, and it is preferably set to 20° or less.

Figure 14:
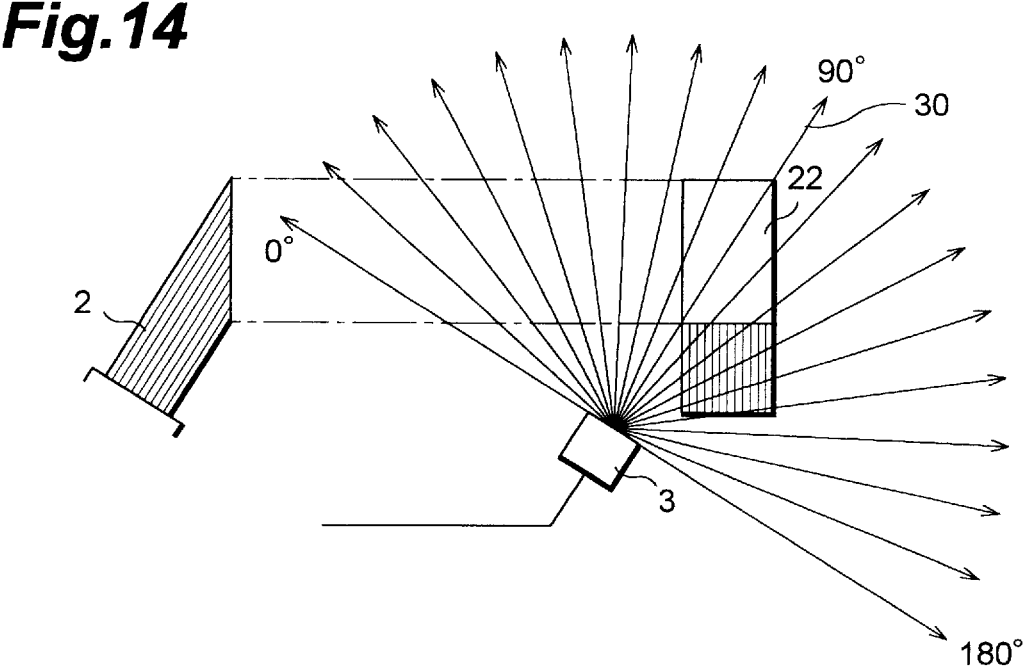
FIG. 14 is a view for explaining divergence of a luminous flux emitted from a light source.
Figure 16:
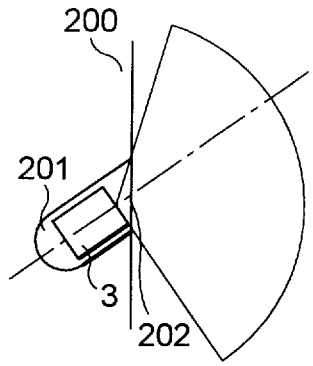
FIGS. 16 to 18 are views respectively showing structures for adjusting the divergent angle of the luminous flux emitted from the light source.
Figure 17:
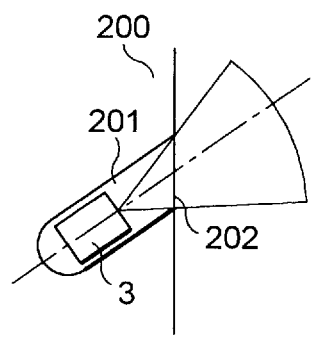
Figure 18:
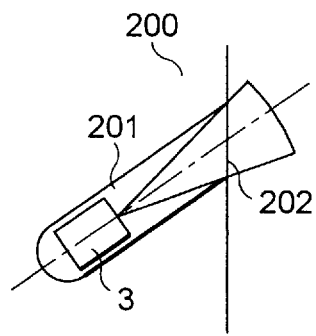

Though a light emitter having a directivity is preferably used as the light source 3, a light source having a predetermined divergent angle about a center pencil 30 may also be utilized as shown in FIG. 14. In the case where such a light source 3 is utilized, however, even when each light source 3 is secured to the fixing hole 201 bored in each of the holding sections 250 and 260 having a height h, the luminous flux from the light source 3 irradiates the entrance surface 22 with a certain extent of divergent angle. Such a divergent angle of the luminous flux emitted from the light source 3 can be regulated when the distance from an opening portion 202 of the fixing hole 201 formed in each of the holding sections 250 and 260 is adjusted as shown in FIGS. 16 to 18. Of course, an optical system (for example, lens) as a collimating means can be also provided at the opening portion 202.

Figure 15:
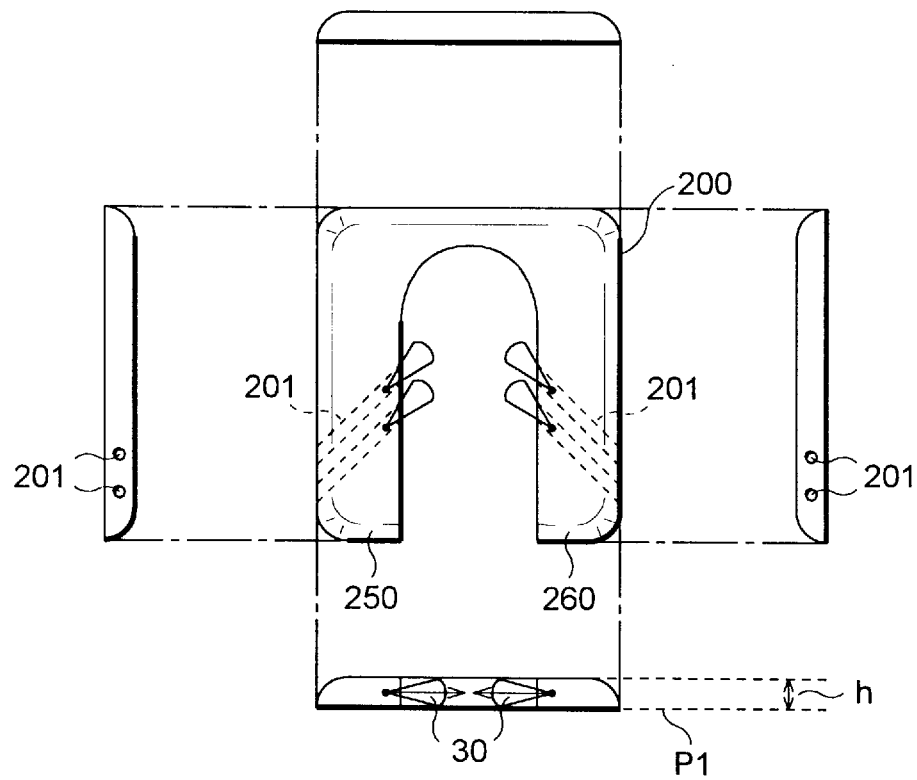
FIG. 15 is a view showing a structure of a holding member for holding the light source at a predetermined position.
Figure 19:
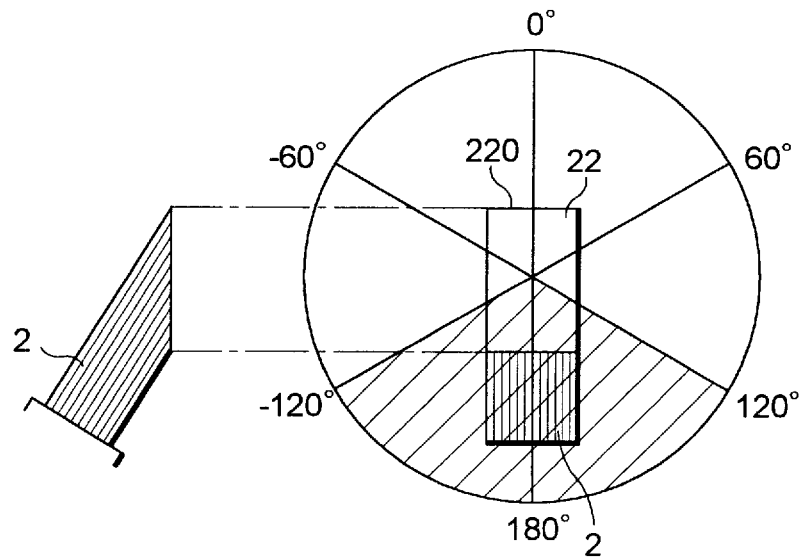
FIG. 19 is a view showing an optimal range for installing the light source in the image input apparatus according to the present invention.

Also, it can be seen that, since the horizontal incident angle component $\theta_H$ of the luminous flux irradiating the entrance surface 22 is more preferable as it is closer to 0° as mentioned above, in the state where each light source is held by the holding section 200 (such that the center pencil 30 and the entrance surface 22 are in parallel to each other) as shown in FIG. 15, it is preferred that the luminous flux irradiate the entrance surface 22 from within the range of +120° to +180° or of −120° to −180° based on the segment connecting the origin O on the entrance surface 22 and the reference end 220 as shown in FIG. 19. When the advancing direction of the center pencil 30 is within this range, of directional vector components of the center pencil 30, at least a component on the entrance surface 22 advances from the auxiliary end 230 toward the reference end 220.

Figure 20:
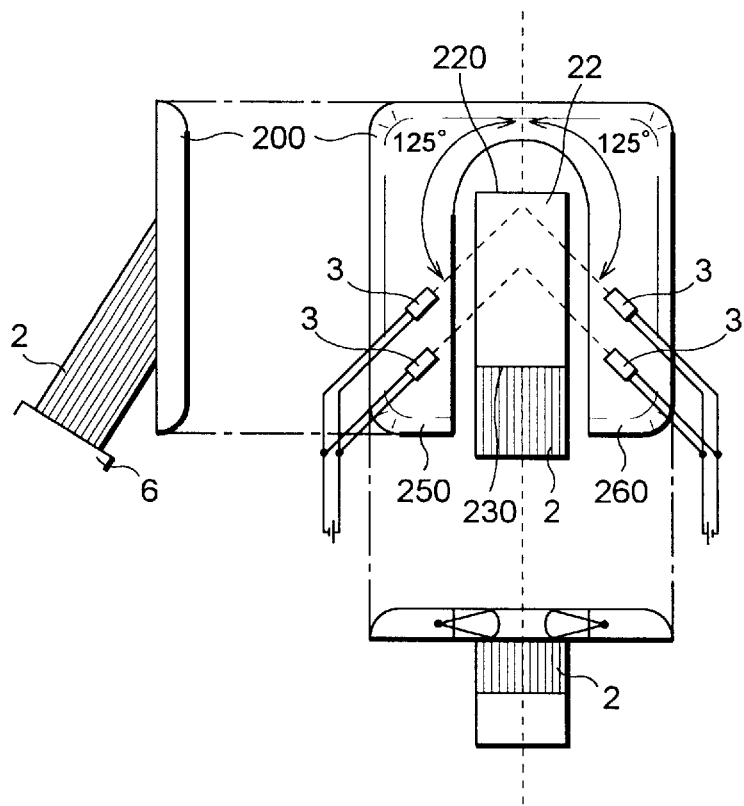
FIG. 20 is a view for explaining the state of installation of the light source in the image input apparatus according to the present invention.

In view of the foregoing studies, in the image input apparatus according to the present invention, the holding member 200 holds each light source 3 at a position where the center pencil 30 from the light source 3 becomes in parallel to the entrance surface 22 while forming an angle of 125° with respect to an axis (coinciding with the y axis) on the entrance surface 22 perpendicular to the reference end 220 (see FIG. 20).

Figure 21:
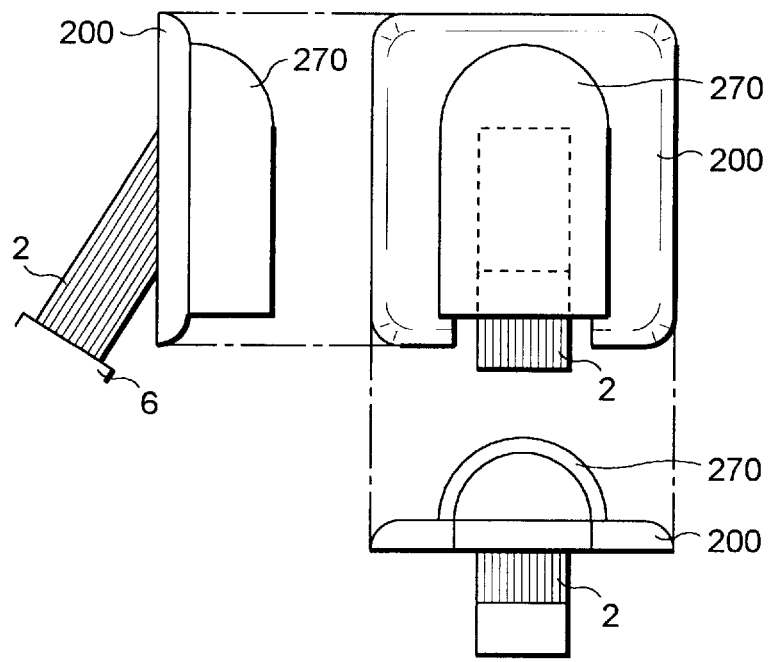
FIG. 21 is a view showing a schematic configuration of a first application of the image input apparatus according to the present invention.

Here, the stray light is not limited to the unnecessary light from the light source 3. Accordingly, as shown in FIG. 21, when the holding member 200 is provided with a light-shielding member 270 for covering the entrance surface 22, the stray light can be more securely prevented from being made incident thereon (first application).

FIGS. 23 to 28 show photographs of the exit surface 23 of the FOP 2 represented on a display when the vertical incident angle component $\theta_V$ was actually changed.

Figure 22:
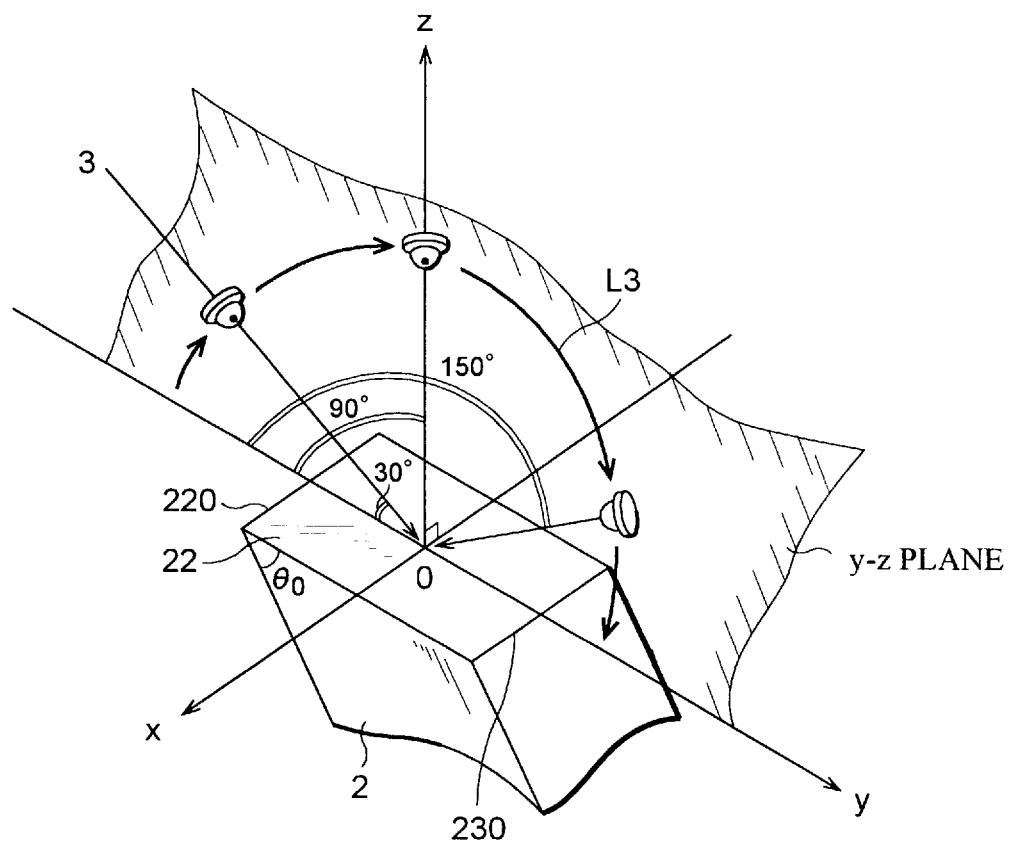
FIG. 22 is a view for explaining a method of photographing an image of the entrance surface of the fiber optic plate concerning the vertical incident angle component.
Figure 28:
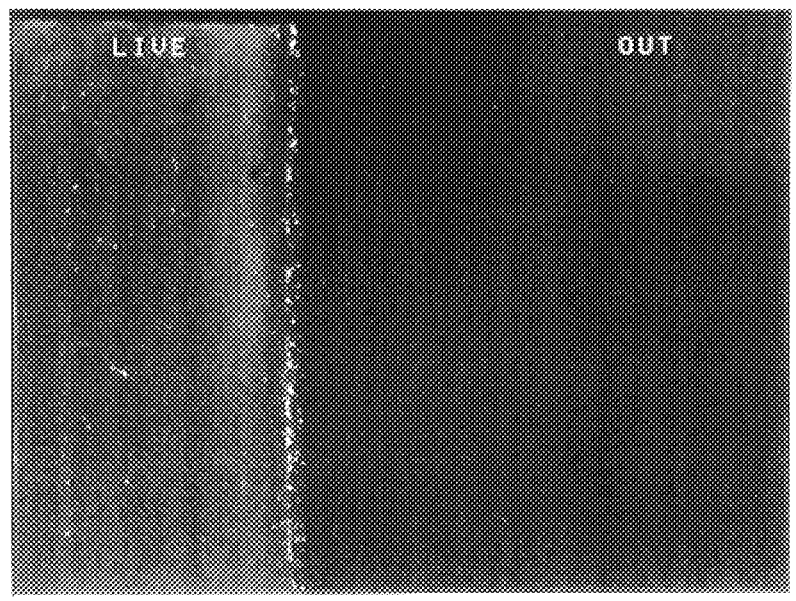

Here, the slant angle $\theta_0$ of the FOP 2 used for photographing was 30°, the horizontal incident angle component $\theta_H$ was 90°, and the light source 3 was moved in the direction of arrow L3 in FIG. 22, thereby the exit surface 23 (each photograph showing the exit surface 23 of the FOP 2 on the left side) was photographed in the respective cases where the vertical incident angle component $\theta_V$ was 0° (FIG. 23), 30° (FIG. 24), 60° (FIG. 25), 90° (FIG. 26), 120° (FIG. 27), and 150° (FIG. 28).

Figure 23:
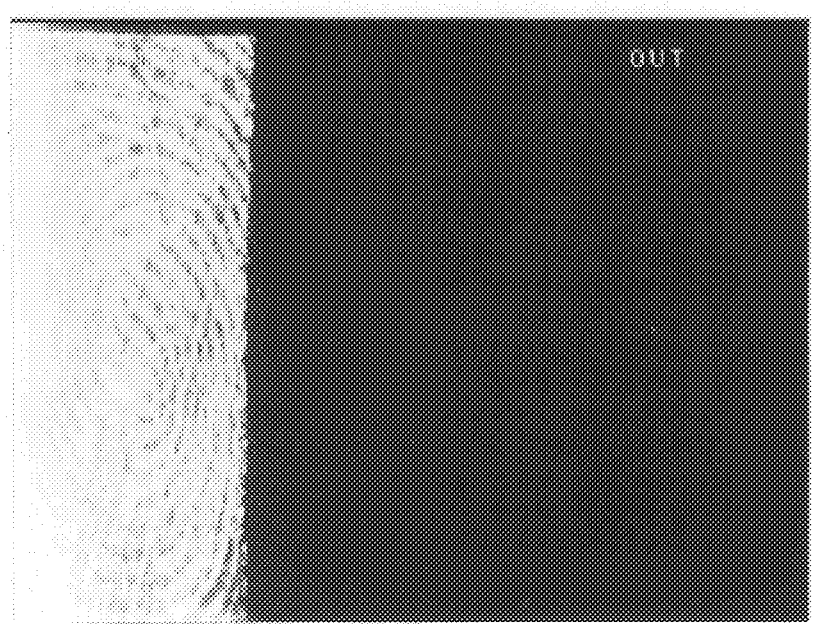
FIGS. 23 to 28 are photographs showing half-tone images of the exit surface of the fiber optic plate represented on a display according to the method shown in FIG. 22, corresponding to images in the cases where the vertical incident angle component is 0°, 30°, 60°, 90°, 120°, and 150°, respectively.
Figure 24:
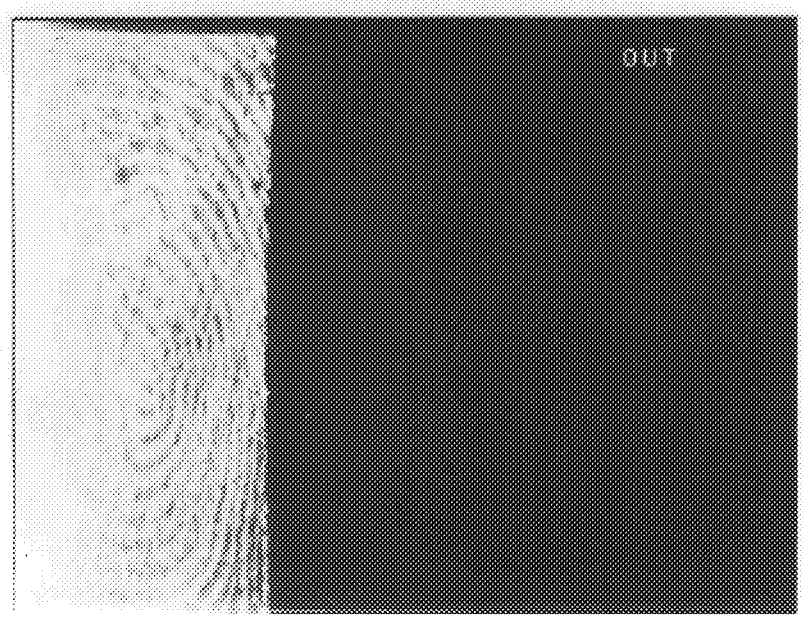
Figure 25:
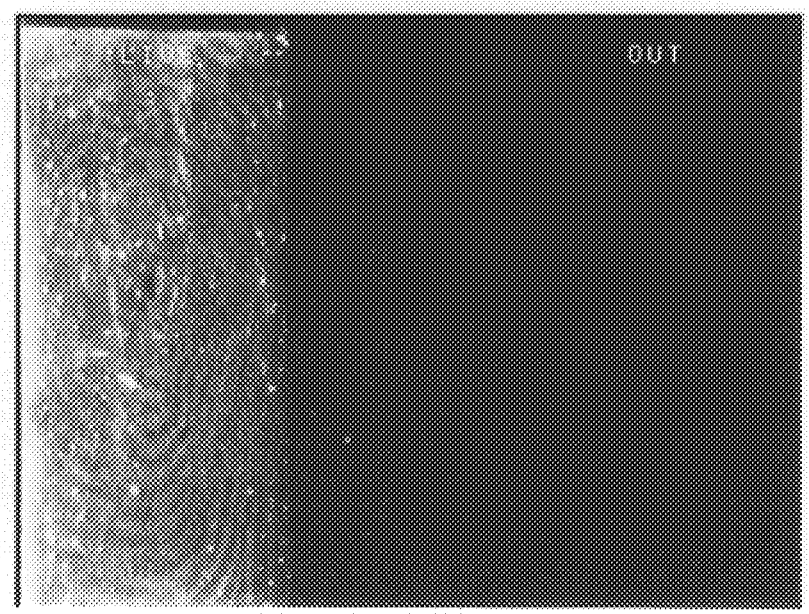
Figure 26:
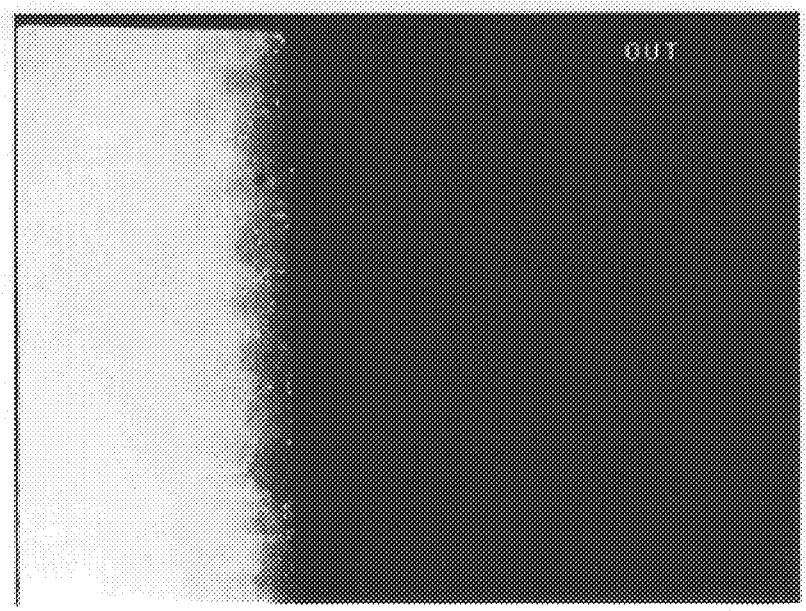
Figure 27:
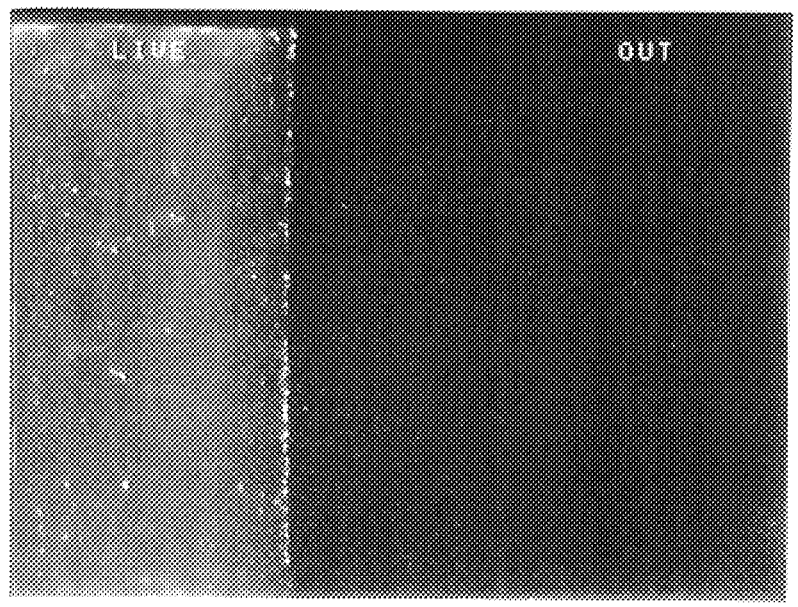

As can be seen from these photographs, the stray light can effectively be restrained from being incident when the vertical incident angle component $\theta_V$ is near 60° or at least 120°. By contrast, when the vertical incident angle component $\theta_V$ is 0° or 30°, the stray light is not so effectively restrained from being incident. Further, when the vertical incident angle component $\theta_V$ is 90°, the stray light is not prevented from being incident. The fingerprint patterns shown in the photographs of FIGS. 23 and 24 are fat components remaining on the entrance surface 22 of the FOP 2. Also, the photographed results coincide with the tendency of the results shown in the graph of FIG. 11 (case where $_{\theta H}$=90°).

As mentioned above, assuming that the core refractive index $n_{core}$ and cladding refractive index $n_{clad}$ of the FOP 2 are respectively 1.50 and 1.45 (NA=0.35), the total reflection critical angle $\Theta$ in the air is about 20°. Assuming that the FOP 2 has slant angles $\theta_0$ of 20° and 30°, the range of the stray light admissible angle X is computed, according to expression (4), as 21° (=41°−20°) to 61° (=41°+20°) and 70° (=90°−20°) to 110° (=90°+20°). Accordingly, when the entrance surface 22 is irradiated with the luminous flux from the LED 3 on the outside of thus given range of stray light admissible angle X, the stray light is not outputted from the entrance surface 23 of the FOP 2, and only the light incident on the entrance surface 22 from the portions in contact therewith is vividly outputted from the exit surface 23.

Figure 29:
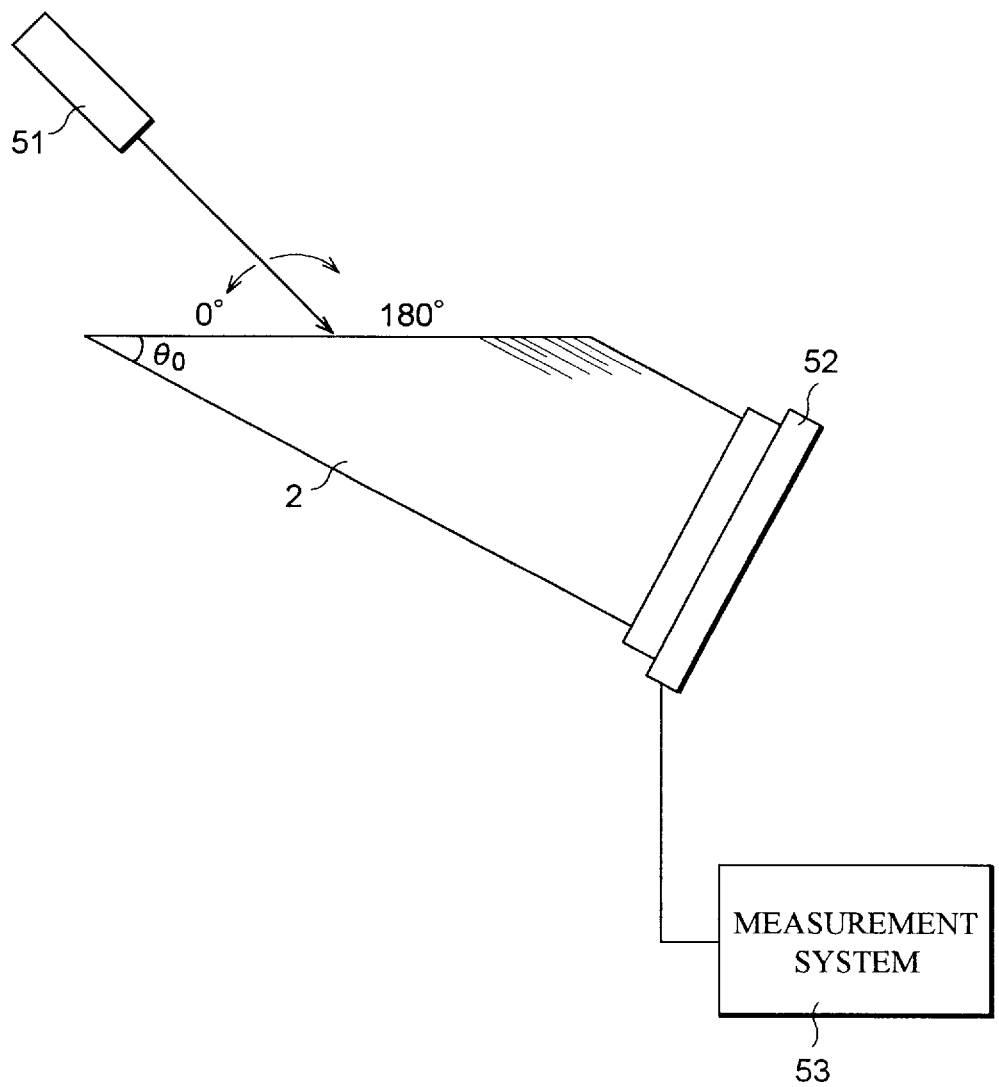
FIG. 29 is a view showing a schematic configuration of an apparatus for measuring stray light output of fiber optic plates having different slant angles when the vertical incident angle component is changed.
Figure 30:
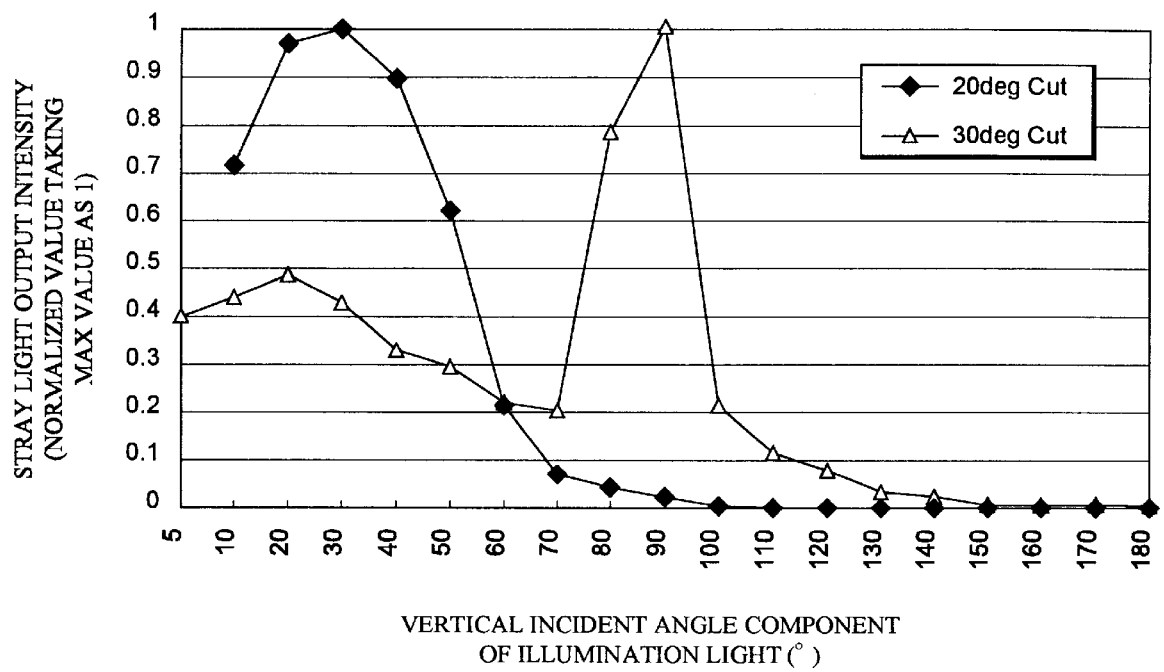
FIG. 30 is a graph showing a relationship between the vertical incident angle component and stray light output measured by the apparatus shown in FIG. 29.

In order to further verify such values of stray light admissible angle X, the inventors measured characteristics of the incident angle component (vertical incident angle component $\theta_V$) and output intensity of stray light by using actual FOPs 2 and a measurement apparatus shown in FIG. 29. FIG. 30 shows measured data obtained from the measurement apparatus shown in FIG. 29. Here, the prepared FOPs 2 respectively have slant angles $\theta_0$ of 20° and 30°. In each FOP 2, the core refractive index $n_{core}$ is 1.50, whereas the cladding refractive index $n_{clad}$ is 1.45 (NA=0.35). In each FOP 2, in the state where the horizontal incident angle component $\theta_H$ was fixed to 90°, the change in output intensity of stray light emitted from the exit surface 23 was measured while the vertical incident angle component $\theta_V$ with respect to the entrance surface 22 was changed from 5° to 180° (the reference end side of the FOP 2 was assumed to be 0°). As the light source, a semiconductor laser 51 (LN9R manufactured by Matsushita Electric Industrial Co., Ltd; 35 mW, 680 nm) was used. As the output intensity measuring means, a CCD 52 (BS7259 manufactured by Matsushita Electronics Industry Corp.) was attached to the exit surface 52, and its output was received by an output detecting apparatus (DVS3000 manufactured by Hamamatsu Photonics K.K.), thereby the stray light output intensity was measured by regional integration.

Referring to the graph of FIG. 30, in the FOP 2 having a slant angle of 20°, the stray light output intensity is maximized at a vertical incident angle component $\theta_V$ of 30° and decreases as the vertical incident angle component $\theta_V$ increases and decreases from this angle. Further, in the FOP 2 having a slant angle of 30°, while the stray light output intensity is maximized at a vertical incident angle component $\theta_V$ of 90° and decreases as the vertical incident angle component $\theta_V$ increases and decreases from this angle, the output intensity tends to increase near an incident angle of 20° as well. In the graph of FIG. 30, the ordinate refers to a normalized value in which the maximum value of stray light output intensity is taken as 1.

As the result of such a measurement, it can be seen that the above-mentioned theoretical value of stray light admissible angle X and the actual incident angle component (vertical incident angle component $\theta_V$) at which the stray light output intensity is maximized substantially coincide with each other as functions depending on the slant angle $\theta_0$. Also, it can be seen that the light incident on the entrance surface 22 within the range of stray light admissible angle X indicated by the above-mentioned expression (4) becomes stray light and is outputted from the exit surface 23. Consequently, when the luminous flux is emitted from the light source 3 with an incident angle with respect to the entrance surface 22 other than the stray light admissible angle X, the stray light can be restrained from being outputted, thereby desired light can clearly be outputted alone.

In the following, a method of using the image input apparatus 1 according to the present invention and its operation will be explained.

In FIG. 4, the LED 3 is disposed such that its luminous flux emitting surface is directed to the entrance surface 22 of the FOP 2, and the entrance surface 22 is irradiated with a luminous flux at an angle other than the stray light admissible angle X. Also, the exit surface 23 of the FOP 2 is provided with a photoelectric conversion device 6 such as CCD such that an image of the light outputted from the exit surface 23 can be converted into an electric signal to be outputted therefrom. In this state, when an object having irregularities on its surface, e.g., the finger 4, is brought into contact with the entrance surface 22 of the FOP 2, as indicated within a dotted circle in FIG. 4, only protruded portions 41 of a fingerprint of the finger 4 come into contact with the entrance surface 22.

On the other hand, the finger 4 is irradiated with light from the LED 3, and this light is made incident on the optical fibers 21 by way of the protruded portions 41 of the fingerprint of the finger 4. Here, since the light from the LED 3 irradiates the entrance surface 22 with the angle other than the stray light admissible angle X, even if it is directly incident on the entrance surface 22 from the air not by way of the finger 4, it will not become stray light so as to be outputted from the exit surface 23.

The light incident on the optical fibers 21 by way of the finger 4 propagates through each optical fiber 21 while being totally reflected thereby and reaches the exit surface 23, from which it is outputted as an image corresponding to the fingerprint (irregularity pattern) of the finger 4. Here, since no stray light is incident on the entrance surface 22 from portions where the entrance surface 22 and the finger 4 are not in contact with each other, portions (depressed portions not in contact with the entrance surface 22) in the exit surface 23 other than the fingerprint image become dark, thereby yielding a clear fingerprint light image with a high contrast. The resulting clear image is fed into the photoelectric conversion device 6 so as to be processed as an electric signal.

As explained above, in the image input apparatus 1 according to the present invention, an object image can clearly be outputted according to the form of irregularities in contact with the entrance surface 22. Accordingly, it becomes quite useful when employed in an apparatus for identifying irregularity forms such as that used for detecting fingerprints.

Figure 31:
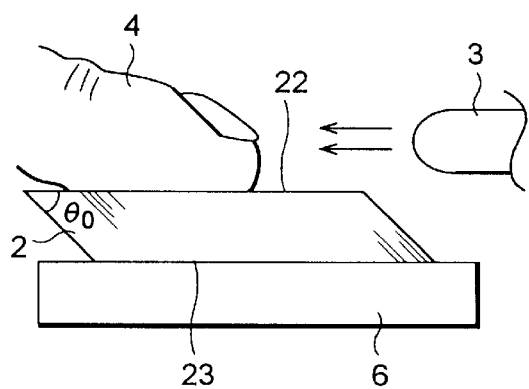
FIG. 31 is a view showing a schematic configuration of a second application of the image input apparatus according to present invention.

Though the above-mentioned image input apparatus 1 uses the FOP 2 having a trapezoidal cross section in which the entrance surface 22 and the exit surface 23 are not in parallel to each other, the FOP 2 may have a parallelogrammatic cross section in which the entrance surface 22 and the exit surface 23 are in parallel to each other (second application). Namely, as shown in FIG. 31, an image input apparatus 1a according to the second application comprises, at least, the light source 3 and the FOP 2 having the entrance surface 22 and exit surface 23 in parallel to each other. Also, in thus configured image input apparatus 1a, when the entrance surface 22 is irradiated with a luminous flux from the light source 3 at an angle other than the stray light admissible angle X as mentioned above, an image corresponding to the protruded portions in contact with the entrance surface 22 can clearly be outputted from the exit surface 23.

Further, the image input apparatus according to the present invention can be realized with various configurations as shown in FIGS. 32 to 35.

Figure 32:
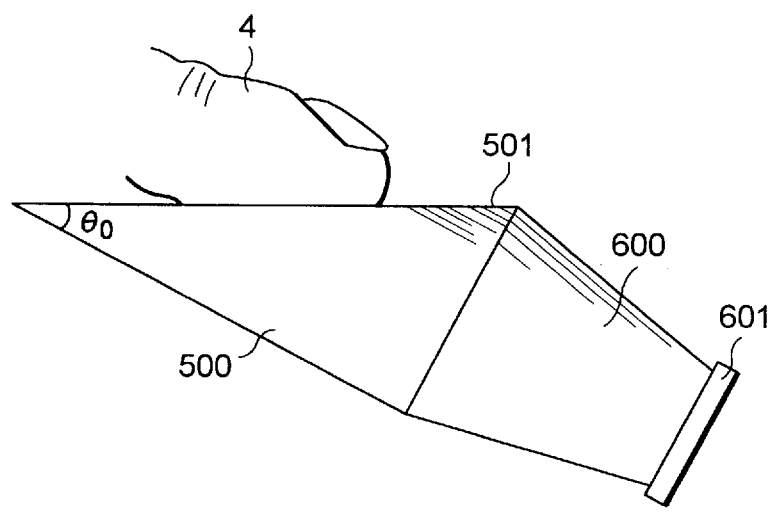
FIG. 32 is a view showing a schematic configuration of a third application of the image input apparatus according to the present invention.

Namely, a third application shown in FIG. 32 is configured such that, between a slant FOP 500 having an entrance surface 501 and an image sensor 601, a taper FOP 600 which tapers down in its cross-sectional area from the slant FOP 500 toward the image sensor 601 is disposed. Also in this configuration, when the entrance surface 22 is irradiated with a luminous flux at an angle other than the above-mentioned stray light angle X, the stray light can effectively be restrained from propagating through the optical fiber.

Figure 33:
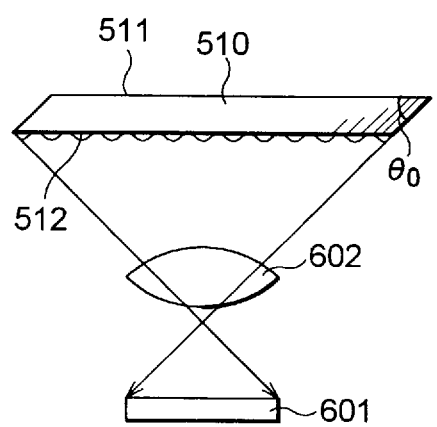
FIG. 33 is a view showing a schematic configuration of a fourth application of the image input apparatus according to the present invention.

A fourth application shown in FIG. 33 comprises a slant FOP 510 having an entrance surface 511 and an exit surface 512 in parallel to each other; an image sensor 601; a slant FOP 510; and an optical system (lens) 602 disposed between the slant FOP 510 and the image sensor 601. Here, the exit surface 512 of the slant FOP 510 has been subjected to scattering processing.

Figure 34:
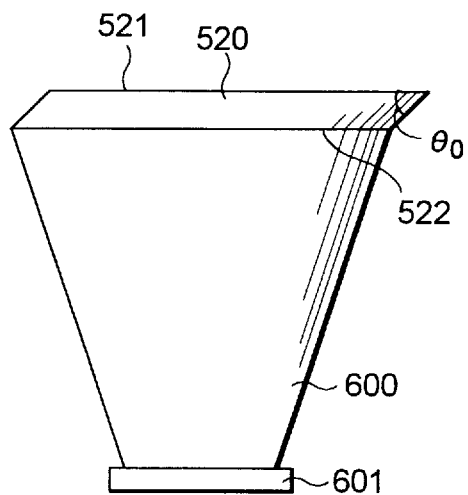
FIG. 34 is a view showing a schematic configuration of a fifth application of the image input apparatus according to the present invention.

A fifth application shown in FIG. 34 comprises a slant FOP 520 having an entrance surface 521 and an exit surface 522 in parallel to each other; an image sensor 601; and, as with the above-mentioned third application (FIG. 32), a taper FOP 600 disposed between the slant FOP 520 and the image sensor 601.

Figure 35:
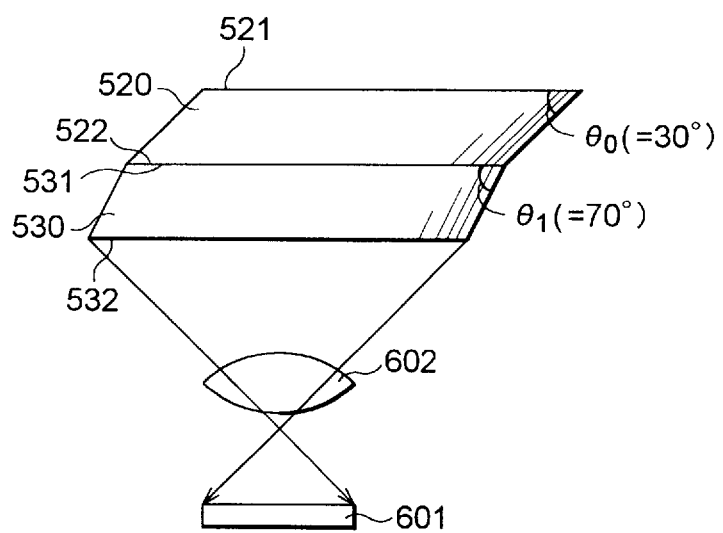
FIG. 35 is a view showing a schematic configuration of a sixth application of the image input apparatus according to the present invention.

A sixth application shown in FIG. 35 comprises a slant FOP 520 having an entrance surface 521 and an exit surface 522 in parallel to each other; an image sensor 601; a slant FOP 530, disposed between the slant FOP 520 and the image sensor 601, having an entrance surface 531 and an exit surface 532 in parallel to each other; and an optical system 602 disposed between the slant FOP 530 and the image sensor 601. In each of thus configured fourth to sixth applications, when the entrance surface 22 is irradiated with a luminous flux at an angle other than the above-mentioned stray light admissible angle X, the stray light can effectively be restrained from propagating through the optical fiber.

As explained in the foregoing, according to the present invention, as light for illuminating the entrance surface is emitted with an angle with respect to the entrance surface other than the stray light admissible angle, only light incident on the entrance surface from protruded portions of an object in contact with the entrance surface is outputted from the exit surface, whereas light incident on the entrance surface from depressed portions of the object not in contact with the entrance surface is not outputted from the exit surface. Accordingly, a clear object image corresponding to the irregularity pattern of the object surface can be obtained.

Also, when a light emitting source having a high directivity is used as a light source or a structure for limiting the divergent angle of the luminous flux from the light source is provided, the irradiating direction of the light from the light source (advancing direction of the luminous flux emitted from the light source) can easily be controlled, whereby the light can be restrained from being irradiated at the stray light admissible angle. Consequently, the desired light can securely be outputted alone from the exit surface.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 8-185149 (185149/1996) filed on Jul. 15, 1996 is hereby incorporated by reference.

What is claimed is:

1. An image input apparatus comprising:

a first fiber optic plate in which a plurality of optical fibers are bundled together, said first fiber optic plate having an entrance surface inclined with respect to an optical axis of said each optical fiber by a predetermined slant angle $\theta_0$ and an exit surface opposing said entrance surface;

a light source for illuminating said entrance surface; and a holding member for holding said light source at a predetermined position, said holding member holding said light source in a state where, of incident angle components formed between a luminous flux emitted from said light source and said entrance surface, a vertical incident angle component $\theta_V$ on a plane orthogonal to a reference end on said entrance surface, said reference end defining said slant angle $\theta_V$, is set to a range deviating from a range of stray light admissible angle X given by the following expression:

$$(X_C-\Theta) \leq X \leq (X_C+\Theta)$$

wherein:

$X_C$ is a stray light admissible center angle given by an expression $(90°-\sin^{-1}(n_{core} \cdot \sin(90°-3\theta_0)))$;

$n_{core}$ is a refractive index of a core in said each optical fiber;

$\theta_0$ is the slant angle;

$\Theta$ is a total reflection critical angle in the air given by an expression $(\sin^{-1}(n_{core} \cdot \sin(90°-S_C-\phi)))$;

$S_C$ is a stray light admissible center angle in said each optical fiber given by an expression $(\sin^{-1}((1/n_{core}) \cdot \sin X_C))$;

$\phi$ is a total reflection critical angle in said each optical fiber given by an expression $(\sin^{-1}(n_{clad}/n_{core}))$; and $n_{clad}$ is a refractive index of a cladding in said each optical fiber.

2. An image input apparatus according to claim 1, wherein said holding member holds said light source in a state where, of the incident angle components formed between the luminous flux emitted from said light source and said entrance surface, a horizontal incident angle component $\theta_H$ on a plane orthogonal to said entrance surface and in parallel to said reference end is set within a range of at least 0° but not greater than 20°.

3. An image input apparatus according to claim 1, wherein the slant angle of said first fiber optic plate is within a range of 25° to 40°.

4. An image input apparatus according to claim 2, wherein said holding member holds light source such that, of directional vector components of a center pencil emitted from said light source, a component on said entrance surface advances from an auxiliary end on said entrance surface opposing said reference end toward said reference end.

5. An image input apparatus according to claim 2, wherein said holding member holds said light source such that, of the luminous flux emitted from said light source, a center pencil becomes in parallel to said entrance surface.

6. An image input apparatus according to claim 1, wherein said holding member comprises a structure for adjusting a divergent angle of the luminous flux emitted from said light source.

7. An image input apparatus according to claim 1, wherein said holding member comprises a light-shielding member for covering, by way of a gap, said entrance surface.

8. An image input apparatus according to claim 1, further comprising a housing for accommodating said first fiber optic plate, said housing having an upper face bored with an opening for exposing said entrance surface; and wherein said holding member is provided on said upper face so as to surround at least a part of said opening of said housing.

9. An image input apparatus according to claim 1, further comprising an image sensor having a light receiving surface provided so as to face said exit surface.

10. An image input apparatus according to claim 9, further comprising a second fiber optic plate provided between said first fiber optic plate and said image sensor, said second fiber optic plate tapering down in its cross-sectional area from said first fiber optic plate toward said image sensor.

11. An image input apparatus according to claim 9, wherein the entrance surface and exit surface of said first fiber optic plate are in parallel to each other.

12. An image input apparatus according to claim 11, further comprising an optical system provided between said first fiber optical plate and said image sensor.

13. An image input apparatus according to claim 12, further comprising a second fiber optical plate provided between said first fiber optical plate and said image sensor, said second fiber optical plate having an entrance surface and an exit surface which are in parallel to each other.

14. An image input apparatus comprising:

a first fiber optic plate in which a plurality of optical fibers are bundled together, said first fiber optic plate having an entrance surface inclined with respect to an optical axis of said each optical fiber by a predetermined slang angle $\theta_0$ and an exit surface opposing said entrance surface;

a housing for accommodating said first fiber optic plate, said housing having an upper face bored with an opening for exposing said entrance surface;

at least a pair of light sources for illuminating said entrance surface; and a holding member having holding sections for respectively holding said light sources such that said light sources surround at least a part of said opening of said housing, said holding sections being provided on said upper face and positioned so as to face each other across said opening of said housing;

wherein said holding member holds said light sources such that, of directional vector components of a center pencil emitted from said light sources, a component on said entrance surface advances from an auxiliary end on said entrance surface opposing a reference end toward said reference end, said reference end defining said slant angle $\theta_0$.

15. An image input apparatus according to claim 14, wherein said holding member holds said light sources such that, of a luminous flux emitted from said light sources, a center pencil becomes in parallel to said entrance surface.

16. An image input apparatus according to claim 14, wherein said holding member comprises a structure for adjusting a divergent angle of a luminous flux emitted from said light sources.

17. An image input apparatus according to claim 14, wherein said holding member comprises a light-shielding member for covering, by way of a gap, said entrance surface.

18. An image input apparatus according to claim 14, further comprising an image sensor having a light receiving surface provided so as to face said exit surface.

19. An image input apparatus according to claim 18, further comprising a second fiber optic plate provided between said first fiber optic plate and said image sensor, said second fiber optic plate tapering down in its cross-sectional area from said first fiber optic plate toward said image sensor.

20. An image input apparatus according to claim 18, wherein the entrance surface and exit surface of said first fiber optic plate are in parallel to each other.

21. An image input apparatus according to claim 20, further comprising an optical system provided between said first fiber optic plate and said image sensor.

22. An image input apparatus according to claim 21, further comprising a second fiber optic plate provided between said first fiber optic plate and said image sensor, said second fiber optic plate having an entrance surface and an exit surface which are in parallel to each other.

\* \* \* \* \*